US012131250B2

(12) United States Patent
Cohen et al.

(10) Patent No.: US 12,131,250 B2
(45) Date of Patent: Oct. 29, 2024

(54) INNER PRODUCT CONVOLUTIONAL NEURAL NETWORK ACCELERATOR

(71) Applicant: Intel Corporation, Santa Clara, CA (US)

(72) Inventors: Ehud Cohen, Kiryat Motskin (IL); Moshe Maor, Haifa (IL); Ashutosh Parkhi, Bangalore (IN); Michael Behar, Zichron Yaakov (IL); Yaniv Fais, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 1530 days.

(21) Appl. No.: 15/720,982

(22) Filed: Sep. 29, 2017

(65) Prior Publication Data

US 2019/0102671 A1    Apr. 4, 2019

(51) Int. Cl.
| | |
|---|---|
| *G06N 3/063* | (2023.01) |
| *G06F 16/17* | (2019.01) |
| *G06F 18/21* | (2023.01) |
| *G06N 3/045* | (2023.01) |
| *G06N 3/08* | (2023.01) |
| *G06V 10/44* | (2022.01) |
| *G06V 10/82* | (2022.01) |
| *G06V 10/94* | (2022.01) |

(52) U.S. Cl.
CPC ............ *G06N 3/063* (2013.01); *G06F 16/17* (2019.01); *G06F 18/21* (2023.01); *G06N 3/045* (2023.01); *G06N 3/08* (2013.01); *G06V 10/454* (2022.01); *G06V 10/82* (2022.01); *G06V 10/955* (2022.01)

(58) Field of Classification Search
CPC ........ G06N 3/063; G06N 3/0454; G06N 3/08; G06F 16/17; G06K 9/00986; G06K 9/4619; G06K 9/4628; G06K 9/6217; G06K 9/66
See application file for complete search history.

(56) References Cited

U.S. PATENT DOCUMENTS

| | | | | |
|---|---|---|---|---|
| 4,945,507 | A * | 7/1990 | Ishida | G06F 7/48 |
| | | | | 708/525 |
| 9,836,691 | B1 * | 12/2017 | Narayanaswami | G06N 3/0454 |
| 10,489,479 | B1 * | 11/2019 | Shalev | G06F 17/12 |
| 2016/0196672 | A1 * | 7/2016 | Chertok | G06V 10/454 |
| | | | | 382/156 |

(Continued)

OTHER PUBLICATIONS

Tang, Tianqi, et al. "Binary convolutional neural network on RRAM." 2017 22nd Asia and South Pacific Design Automation Conference (ASP-DAC). IEEE, Jan. 2017. (Year: 2017).*

(Continued)

*Primary Examiner* — Li B. Zhen
*Assistant Examiner* — Henry Nguyen
(74) *Attorney, Agent, or Firm* — Akona IP PC

(57) ABSTRACT

A convolutional neural network (CNN) accelerator, including: a CNN circuit for performing a multiple-layer CNN computation, wherein the multiple layers are to receive an input feature according to an input feature map (IFM) and a weight matrix per output feature, wherein an output of a first layer provides an input for a next layer; and a mapping circuit to access a three-dimensional input matrix stored as a Z-major matrix; wherein the CNN circuit is to perform an inner-product direct convolution on the Z-major matrix, wherein the direct convolution lacks a lowering operation.

25 Claims, 26 Drawing Sheets

(56) References Cited

U.S. PATENT DOCUMENTS

| | | | |
|---|---|---|---|
| 2017/0103299 A1* | 4/2017 | Aydonat | G06N 3/063 |
| 2017/0116495 A1* | 4/2017 | Nomura | G06F 17/153 |
| 2017/0241786 A1* | 8/2017 | Ohira | G01P 7/00 |
| 2017/0286830 A1* | 10/2017 | El-Yaniv | G06N 3/0481 |
| 2017/0368682 A1* | 12/2017 | Danjo | G06N 3/063 |
| 2018/0089590 A1* | 3/2018 | Suresh | G06F 17/12 |
| 2018/0189227 A1* | 7/2018 | Korthikanti | G06F 9/30036 |
| 2018/0197081 A1* | 7/2018 | Ji | G06N 3/0454 |
| 2019/0014320 A1* | 1/2019 | Navarrete Michelini | H04N 19/61 |

OTHER PUBLICATIONS

Alemdar, Hande, et al. "Ternary neural networks for resource-efficient AI applications." 2017 international joint conference on neural networks (IJCNN). IEEE, May 2017. (Year: 2017).*

Nurvitadhi, Eriko, et al. "Can fpgas beat gpus in accelerating next-generation deep neural networks ?. " Proceedings of the 2017 ACM/SIGDA International Symposium on Field-Programmable Gate Arrays. Feb. 2017. (Year: 2017).*

Zhi S, Liu Y, Li X, Guo Y. LightNet: A Lightweight 3D Convolutional Neural Network for Real-Time 3D Object Recognition. In3DOR @ Eurographics Apr. 2, 20173. (Year: 2017).*

Kim, Yong-Deok, et al. "Compression of deep convolutional neural networks for fast and low power mobile applications." arXiv preprint arXiv:1511.06530 (2015). (Year: 2015).*

* cited by examiner

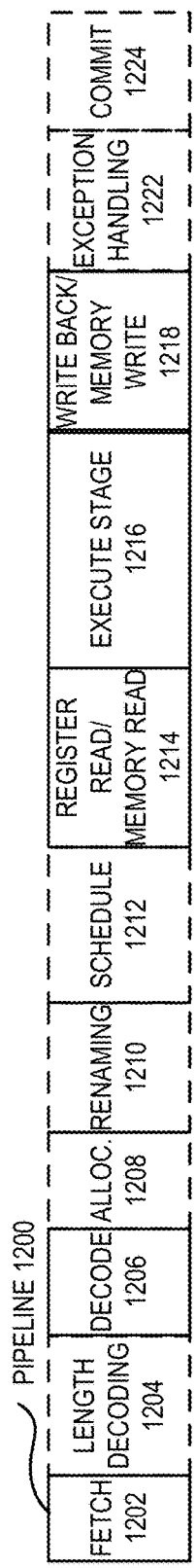
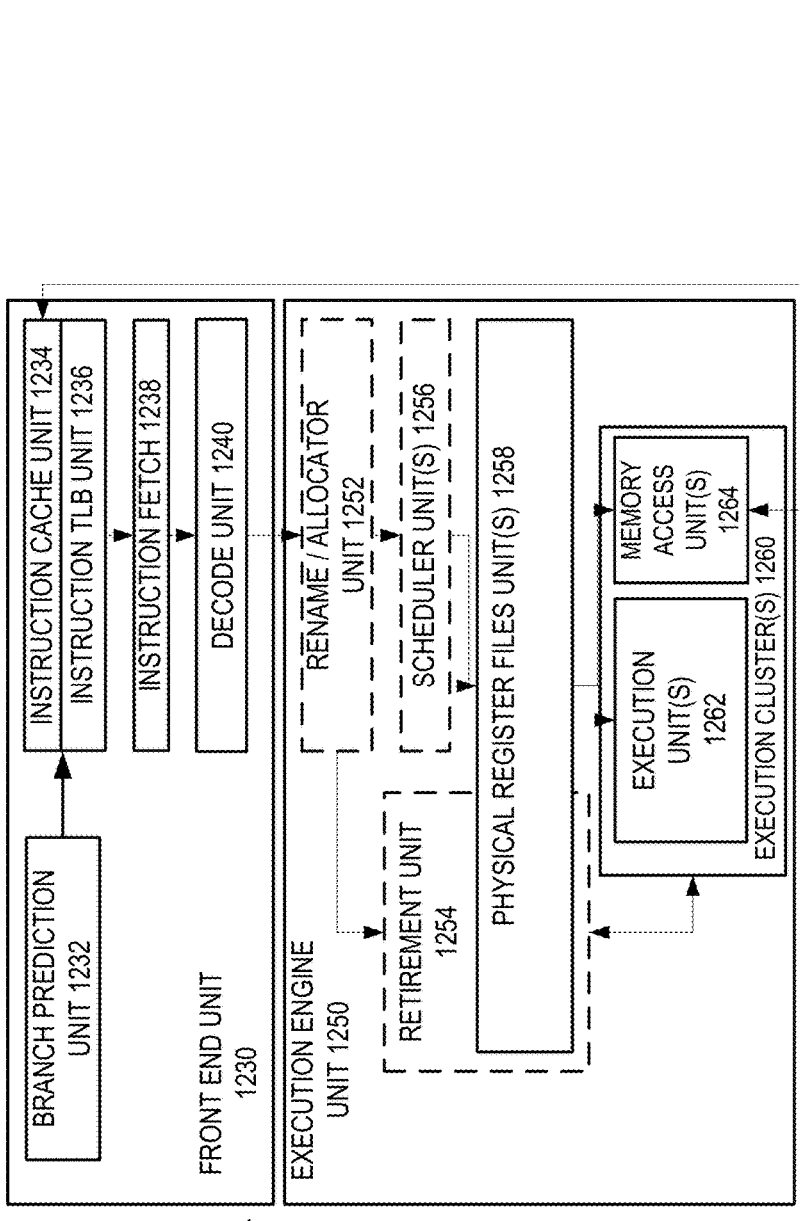
Fig. 12a
Fig. 12b

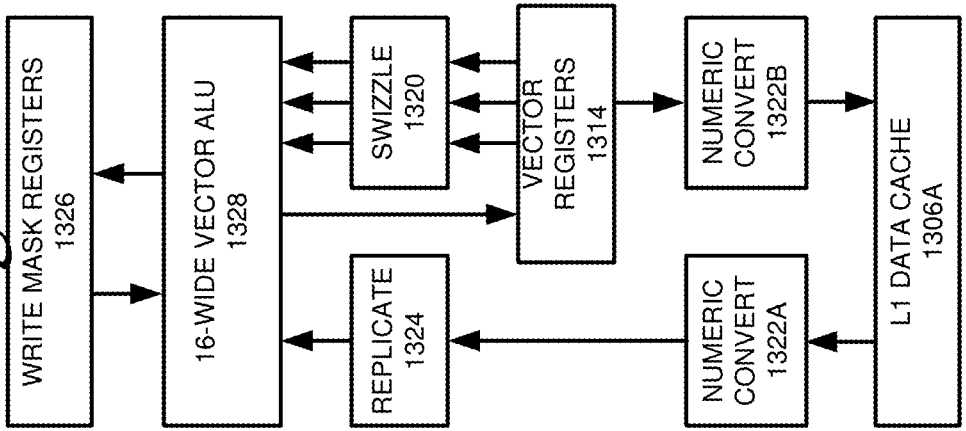
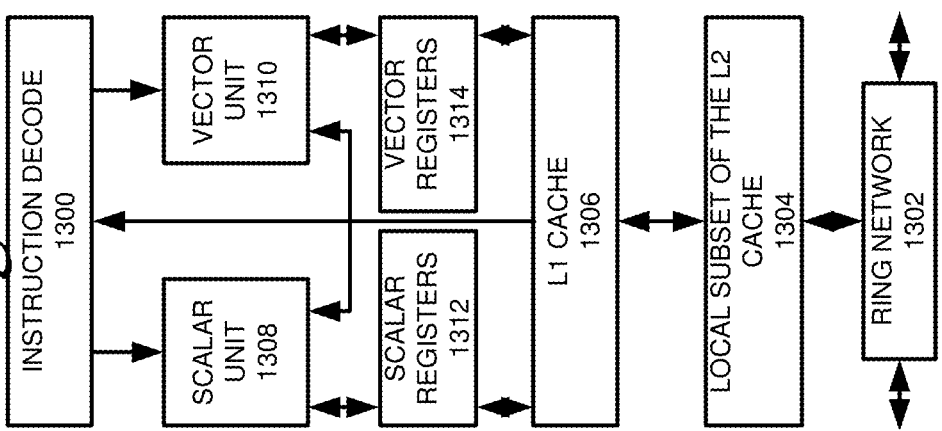

INNER PRODUCT CONVOLUTIONAL NEURAL NETWORK ACCELERATOR

FIELD OF THE SPECIFICATION

This disclosure relates in general to the field of semiconductor devices, and more particularly, though not exclusively, to a system and method of providing an inner product convolutional neural network accelerator.

BACKGROUND

Multiprocessor systems are becoming more and more common. In the modern world, compute resources play an ever more integrated role with human lives. As computers become increasingly ubiquitous, controlling everything from power grids to large industrial machines to personal computers to light bulbs, the demand for ever more capable processors increases.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

FIG. 12a is a block diagram illustrating both an example in-order pipeline and an example register renaming an out-of-order issue/execution pipeline, according to one or more examples of the present specification.

FIG. 12b is a block diagram illustrating both an example of an in-order architecture core and an example register renaming an out-of-order issue/execution architecture core to be included in a processor, according to one or more examples of the present specification.

FIGS. 13a-13b illustrate a block diagram of a more specific in-order core architecture, which core would be one of several logic blocks (including other cores of the same type and/or different types) in a chip, according to one or more examples of the present specification.

EMBODIMENTS OF THE DISCLOSURE

Figure 1:
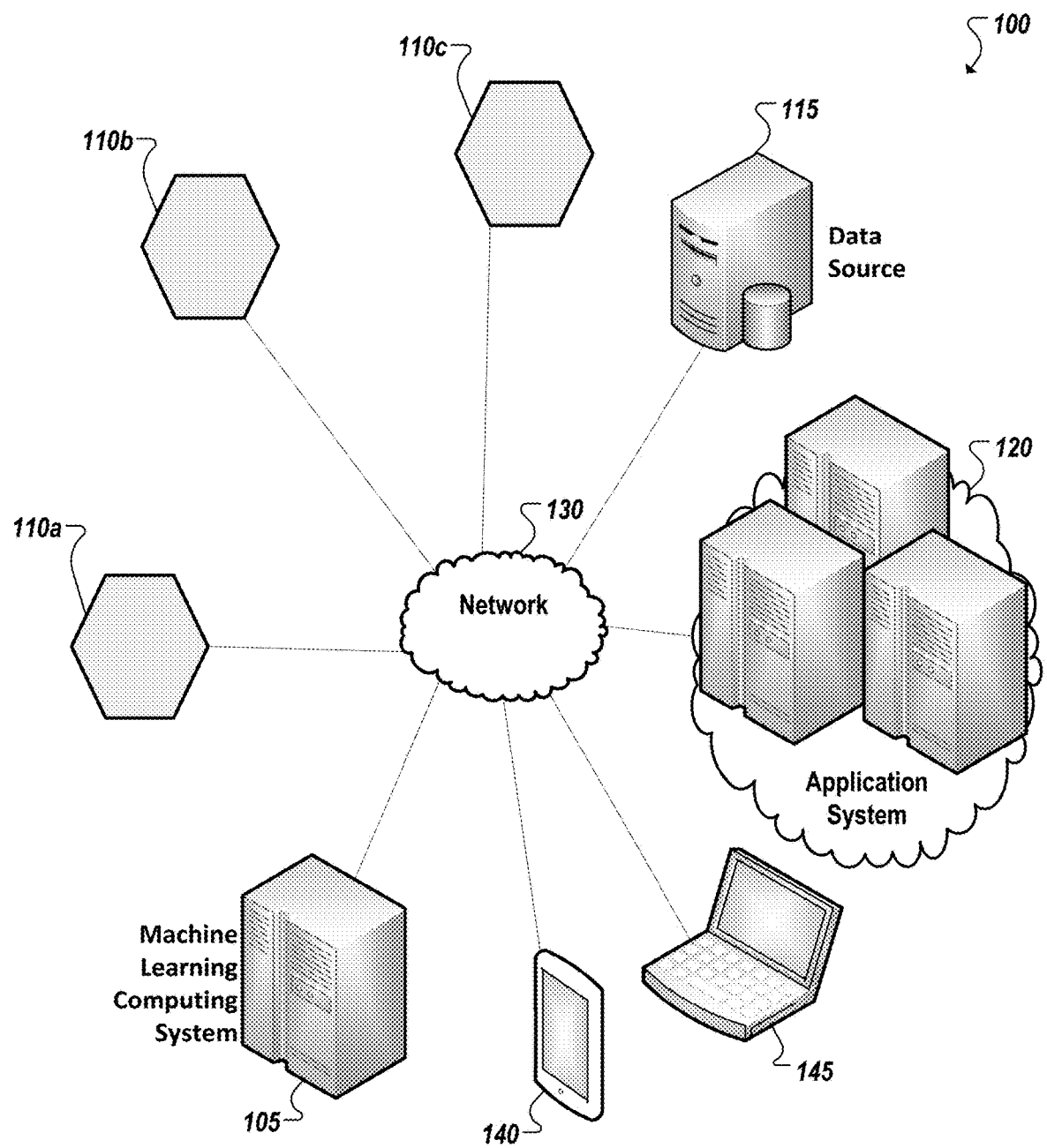
FIG. 1 illustrates a machine learning computing system which may accept as inputs data from one or a variety of sources, according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

A convolutional neural network (CNN) is a useful type of machine learning network featuring deep, feedforward artificial neural networks. CNNs can use multilayer perceptrons and shared weight architectures to emulate learning processes. Because CNNs are modeled after real-world biological processes, they are useful in reproducing biological behavior. For example, CNNs find application in computer vision, natural language processing, video recognition, taxonomic and classification systems, and recommender systems. Advantageously, CNNs require relatively less preprocessing than some other image classification algorithms. The CNN can intelligently "learn" certain filters that in other types of systems may need to be programmed by hand, by a system designer.

CNNs have recently become a primary tool for solving artificial intelligence (AI) problems. One advantage of a CNN is the generality of the solution, which allows deployment of CNNs in a wide range of problems with different topologies and training processes. CNN operation includes a large number of computations (e.g., convolutions) where the contribution of many terms is accumulated. This approach provides an accurate result, although in some embodiments, there is high redundancy in the result. This redundancy translates into high power and area consumption of the CNN accelerator, therefore resulting in low efficiency. Efficiency can be improved and redundancy eliminated by optimizing the CNN. For example, the CNN can provide efficient handling of sparse data, including input feature maps (IFMs), output feature maps (OFMs), and/or weights. The CNN may also operate with reduced precision in computation of IFMs, OFMs, and/or weights.

A CNN generally includes several layers in each topology. These layers include convolution layers, pooling layers, and reduction layers. While convolution and pooling layers are well defined for any data type, the reduction layer can be improved by defining it for topologies with low precision data types, such as 1-bit, 2-bit, or 4-bit. Embodiments of the present specification provide efficient methods for supporting both 1 and 2-bit data type operations using the same logic.

CNNs use a mathematical convolution whereby elements of a feature defined by an IFM are mathematically convoluted with a weight matrix, and then mapped to an output feature according to an OFM. For example, a three-dimensional neural network may include an input feature array that includes height and weight dimensions (which may be referred to as X and Y axes) along with an IFM dimension, which may be referred to as the Z axis, which specifies the number of features in the array to be processed. Each feature in the input array may include a plurality of elements, each with size k×k. For example, an instance of a feature may include a 3×3 element size, with the feature having a matrix of a plurality of such 3×3 elements, so that the individual feature instance may have a larger size, such as 15×15. The entire IFM may include a three-dimensional array including an array of these matrices.

The convolution operation involves performing a sum of products, wherein each feature instance is convoluted with a three-dimensional weight matrix. Each weight matrix has size KYK, and a depth equal to the depth of the OFM. For example, if the depth of the OFM is 512 features, then there would be 512 three-dimensional weight arrays in the weight matrix. Each three-dimensional weight array may have the same depth as the IFM. Note that the depth of the IFM and the depth of the OFM may be the same or may be different according to the design of the system.

Perceptrons are processed in layers, wherein the output of each layer becomes the input to the next layer. Depending on the design of the system, the feature matrix may be convoluted with the weight matrix in either an inner product fashion or an outer product fashion. Although the inner product processing is very efficient, embodiments of inner product processing require a "lowering" operation after the convolution is performed, to remap high-dimensional input tensors into a series of standard matrix multiplications.

However, embodiments of the present specification provide for a system wherein a CNN may perform an inner product operation without the need of a lowering operation to reformat the data. This can be accomplished by orienting the IFM into a "Z-major" format. Existing CNNs generally orient data into an "X-major" orientation. This is a natural orientation for the data, in which data are oriented in memory sequentially according to the X dimension of the IFM. To place the IFM in Z-major format, the IFM is rotated on all three axes so that entries are sequential in memory according to the Z value rather than the X value. Thus, an inner product operation may be applied between the IFM vector and the weight vector. Each vector may keep many elements (for example, 512 elements, 256 elements, or similar—512 is a useful selection because it aligns with the size of the memory cache line). In some embodiments, the result of the inner product may be accumulated into a single accumulator if a low precision data type is used. In contrast, in the case of high precision accelerators, a separate accumulator per element may need to be maintained.

Using an inner product method, the ratio between operations and accumulators can be highly improved, and therefore less area and power may be allocated for accumulation and more area and power consumed for actual execution.

Furthermore, in embodiments where very low precision inputs are used, such as 1-bit or 2-bit, a truth table may be constructed so that the operation between any two elements can become a simple logic operation between the IFM and the weight, rather than a mathematical operation. Thus, the combination of an inner product CNN operation along with the use of a very low precision IFM and/or weight matrix may realize substantial gains in power consumption and surface area consumption on the system. The operator to accumulator ratio can be taken to extremely high values, such as 512 to 1, or 256 to 1 in certain embodiments.

Embodiments of a low precision inner product CNN of the present specification have been found to consume approximately one-tenth the surface area of a high precision CNN, while the peak number of operations between elements per cycle was found to increase approximately 16 times. The power consumption of the execution of an entire layer was found to be approximately one-tenth that of a high precision CNN.

Also disclosed in this specification are methods for converting high precision inputs into a low precision IFM. Thus, high precision data can be gathered or collected as an input, but need not be maintained throughout the CNN operation, as the high precision is not necessary for all CNN computations. In many applications, a low precision computation yields as much or nearly as much useful information as a very high precision computation, while consuming substantially less power, surface area, and time.

Embodiments of the present disclosure may use a programmable application-specific instruction set processor (ASIP) and dedicated, detailed communication paths to drive a CNN accelerator block. ASIPs are components often used in system-on-a-chip designs, wherein the ASIP may have an instruction set that can be tailored to benefit a specific application. This can include, for example, a core processing element that provides generic instructions, along with a configurable element with a configurable instruction set. The configurable element may be embodied in a field-programmable gate array (FPGA), or static logic for the ASIP may be configured at design time to provide the ASIP with instructions for a dedicated purpose.

Embodiments of the present specification includes decode circuitry that processes certain specialized instructions, including a specialized instruction set architecture (ISA) for or implemented by an ASIP digital signal processor (DSP) that allows for very fast communication paths with a CNN accelerator block to allow the overhead of the ASIP firmware to be hidden behind the accelerator hardware operation, while maintaining a high level of flexibility of actual operations which allow for future tuning of the implementation even after production.

There are further disclosed herein embodiments of a CNN accelerator that provide a plurality of different low precision network blocks, which can share a common adder tree. This sharing of a common adder tree may be possible, for example, where the set of possible outputs of one precision type vary from the set of possible outputs of a second precision type only by a multiplicative factor. For example, a binary neural network (BNN) and a ternary neural network (TNN) can both share an adder tree on the principle that the sum of products for a TNN is selected from the set $\{-1, 0, +1\}$, while for a BNN, the product of the two elements is selected from the set $\{-2, 0, +2\}$. Thus, the BNN and the TNN can share a common adder tree, with a simple multiplexer being provided and with the result being left shifted by 1 bit, or in other words, multiplied by 2. Thus, in effect, the 2 can be factored out from the data set of the BNN, and after results have been propagated through the adder tree, the result can be left shifted (i.e., multiplying the 2 back in), thus allowing the BNN and TNN to share a common adder tree with no loss of information.

The solution disclosed herein may generalize the method of applying the reduction layer of low precision layers. This includes several operands per map or per pixel. Possible reduction methods include bit select or quantization. With a quantization method, the operands are applied on a per map or per pixel basis.

According to embodiments of the present specification, the reduction layer can be viewed as a function where the inputs to the function are:
1. Content of accumulator—the result of convolution which is a sum of products.
2. Operands
   a. Operand per map—per plane of OFM along the depth dimension. These may be referred to as "vector layout" operands.
   b. Operand in map—per OFMs within a plane. These are called "plane layout" operands.

Embodiments of the specification may include an output OFM with reduced data type from, for example, INT32 down to INT1 or INT2.

A system and method for an inner product convolutional neural network accelerator will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

Certain of the FIGURES below detail example architectures and systems to implement embodiments of the above. In some embodiments, one or more hardware components and/or instructions described above are emulated as detailed below, or implemented as software modules.

FIG. 1 illustrates an example computing system including a machine learning computing system 105, which may accept as inputs, data from one or a variety of sources. For instance, sources may include sensor devices (e.g., 110a-c). Such devices 110a-c may detect and/or measure attributes of an environment and generate sensor data describing or capturing characteristics of the environment. For instance, a given sensor may be configured to detect such characteristics as images, video, sound, movement, weight, physical contact, temperature, wind, light, computer communications, wireless signals, humidity, the presence of radiation or specific chemical compounds, among several other examples. Sensors may generate files, numerical data, or data of other formats describing these attributes, audio data, photographic images, video, among other sensor data. Sources may additionally include data stores, such as databases of one or more computing systems (e.g., 115), which may aggregate data and/or generate additional data (e.g., from post processing of the aggregated data), such as in connection with a governmental, enterprise, scientific, or other entity or project. Data from the one or more sources (e.g., 110a-c, 115, etc.) may be provided to the machine learning computing system 105 to perform machine and deep learning on the information encapsulated in the data. Results produced by the machine learning computing system 105 may be additionally consumed, for instance, by an application system 120 hosting one or more other processes, programs, or applications. User endpoint devices (e.g., 140, 145), such as personal computers and mobile devices, may additionally make use of the results generated from or in connection with a machine learning computing system 105, such as through the consumption of the results by one or more applications hosted by the user devices (e.g., 140, 145), presenting the results on a graphical user interface of the user device, among other examples.

In some instances, as implied by the example illustrated in FIG. 1, a machine learning computing system 105 may be provided as a service (e.g., over a network 130) to one or more other systems (e.g., 120, 140, 145). A machine learning computing system 105 may additionally utilize inputs generated by remote systems (e.g., an Internet of Things (IoT) network composed of multiple sensor devices (e.g., 110a-c). In other instances, the functionality of a machine learning computing system 105 may be integrated with any one of the other example systems (e.g., 110a-c, 115, 120, 130, 140, 145, etc.), including devices (e.g., 110a-c), which produce data to be processed using the machine learning functionality of machine learning computing system, systems (e.g., 120) which are to consume results of the machine learning computing system, gateway or data aggregation systems interfacing with various data sources (e.g., 110a-c, 115, etc.), among other examples. For instance, a wearable device or IoT device (e.g., 110a-c) may be provided with machine learning computing resources to operate directly on inputs generated by a sensor of the device. As another example, an application or service may be provided (e.g., by application server system 120), which includes and makes use of machine learning computing resources, among a variety of other examples and use cases. Further, machine learning computing systems may utilized to support or implement products or services based on or utilizing artificial intelligence, including digital personal assistants, chat bots, video games, self-driving cars, robots, and other examples.

In some implementations, an example machine learning computing system (e.g., 105) may be instrumented with hardware and logic to effectively perform machine learning algorithms and tasks, including applications relating to or utilizing deep learning, neural networks, computer vision, speech and/or voice detection, biometric analysis, and other example uses. As machine learning tasks and applications may, in some cases, be resource intensive and latency sensitivity, in some implementations, it may be desirable to implement example machine learning computing functionality using specialty hardware, microarchitectures, instruction sets, firmware, and other hardware and/or software logic to accelerate or enhance the performance of computing tasks relating to the machine learning tasks and algorithms. While such hardware components and logic (included those discussed herein) may be well-suited to use in connection with machine learning applications or machine learning computing systems, it should be appreciated that the functionality, enhancements, and features discussed herein may be potentially employed in any computing system implementation or application.

In general, "servers," "clients," "computing devices," "network elements," "hosts," "system-type system entities," "user devices," "sensor devices," and "systems" (e.g., 105, 110*a-c*, 115, 120, 130, 140, 145, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing apparatus. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

As introduced above, software and/or firmware programs may be developed that are configured to perform a variety of different tasks and services, including tasks and services relating to computer vision, deep learning, or another machine learning use case. In some cases, operation of the program may involve sequential reads/writes from/to a buffer that may be arranged as a circular buffer, cyclic buffer, ring buffer, etc.

In traditional solutions, software would be utilized to handle data in the buffer to check to see whether the current packet wraps around and to take appropriate measures to handle wraparound when it occurs. Such packet-handling software may be rather complicated, however, and the possibility of wraparound may also make it difficult or impossible to perform certain functions. Such functions may include parsing the packet, writing data into the packet, copying the packet, or jumping to a point within the packet based on an offset from the beginning of the packet. Further developing code of programs to implement algorithms to manage wraparounds and fixing of these wraparounds can be cumbersome and error prone, and the resulting software-based logic may significantly reduce the performance capabilities of the code. For example, in machine learning applications realized using code that performs a filter over a region of an image that is loaded chunk-by-chunk, the code, when conventionally written, is required to check and fix the pointer every time it is moved (or at least every time it is moving to a different line, if lines are contiguous in memory), among other examples.

In some implementations, traditional "fixing" code for the pointers may be required to know about each of the various buffers used by the software component (and cooperating software components also utilizing such buffers) so as to accurately and appropriately fix the pointers, among other design challenges.

For example, an example processor device may include an ISA (and/or firmware) to expose an operation supported by the enhanced microarchitecture of the processor device to user code that fixes a given, without cumbersome code to define the logic explicitly within the program. For instance, a register "reg1" may hold the pointer that is to be fixed. The fixing operation defined in the instruction set performs the fixing operation directly, which the program or kernel source code (e.g., C source level code) may call simply, for instance through a macro, instruction, function, intrinsic function, or other mechanism (e.g., "FIX_POINTER ptr", etc.), among other examples.

Figures 2A, 2B:
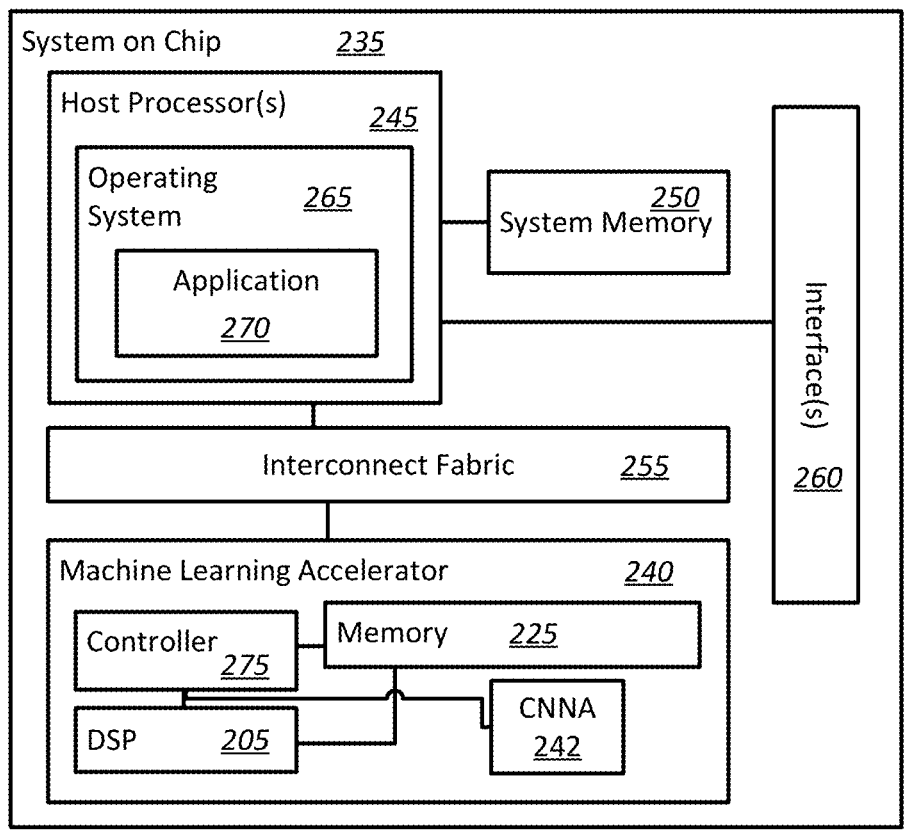
FIGS. 2a-2c are simplified block diagrams of example systems including a processor device, according to one or more examples of the present specification.
Figure 2C:
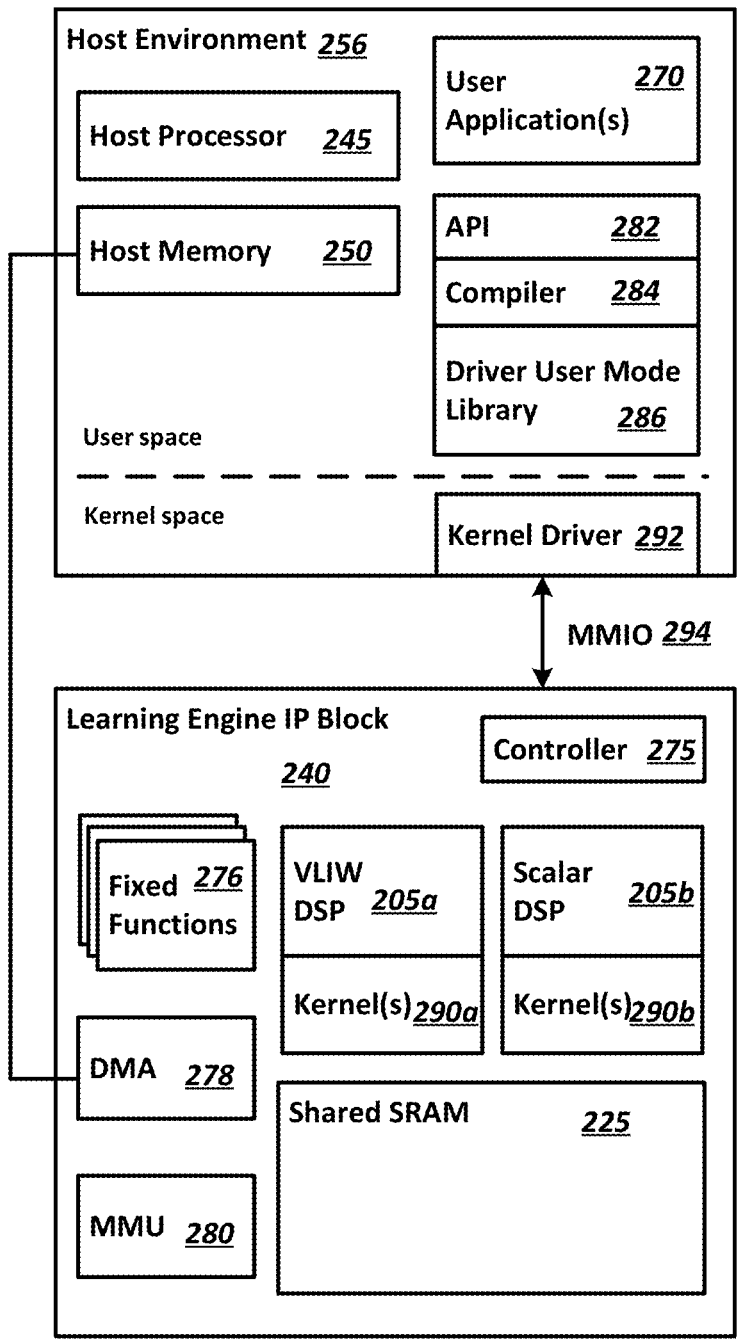

FIGS. 2*a*-2*c* are simplified block diagrams of example systems including a processor device, according to one or more examples of the present specification.

Turning to the example of FIG. 2*a*, a simplified block diagram 200*a* is shown illustrating an example implementation of a processor device 205 that incorporates an ISA configured to support an operation to automate and abstract away the fixing of a pointer used by one or more software components within a computing environment. The processor device 205 may further execute an operating system 215, which may be used to manage the execution of various software components (e.g., of an application 220), including the assignment of memory 225 for use by each software component. In connection with managing application 220 (or other software components), the operating system 215, in some implementations, may also identify the memory requirements of the software component and reserve portions of the memory 225 for use by the software components. A processor device (e.g., 205), such as in the example of FIG. 2*a*, may be utilized in a variety of different computing systems and architectures. As one example, turning to the simplified block diagram 200*b* of FIG. 2*b*, a system on chip (SoC) 235 may be provided on which an accelerator device 245, or computing block, is provided. In some implementations, the processor device 205 may be provided on an SoC 235 as included in a particular IP block or as another processor node in the system 235, among other example implementations.

Continuing with the example of FIG. 2*b*, the SoC 235 may additionally include other components to facilitate software components and other functionality which uses or builds upon the software components utilizing processor device 205. For instance, other processor nodes, such as host processors (e.g., 245) and corresponding system memory 250 may be provided on the SoC 235, and these may be used to implement a general purpose operating system 265, in which one or more applications 270 may be run. The SoC may further include an interconnect fabric 255 (e.g., provided using Peripheral Component Interconnect Express (PCIe), UltraPath Interconnect (UPI), Infiniband, or other communication technologies) and one or more interfaces (e.g., 260) to allow the SoC to connect to other system elements (e.g., using a PCIe, Universal Serial Bus, Ethernet, or other interface), among other example features.

In the example of FIG. 2*b*, host processor 245 may be utilized to run an application 270 that includes logic supporting one or more machine learning tasks. To enhance the performance of this application 270 (as well as other applications), a machine learning accelerator block 240 may be provided that includes logic (e.g., controlled or orchestrated using a controller 275) that allows the application to be run more efficiently and effectively (as compared to running the application using only the capabilities of the host processor 245). In some implementations, the application 270 can include code that makes use of API calls corresponding to logic in the accelerator 240 generally, and in processor device 205 specifically (e.g., using a communication channel facilitated between the host processor 245 and accelerator 240 using an interconnect fabric 255, among other example implementations.

The example of FIG. 2c illustrates at least a portion of a device (host environment 256) implementing a computer vision or deep learning engine component (e.g., which may be included in a system (e.g., as an intellectual property (IP) computing block within a SoC) tasked with performing or supporting computer vision or deep learning tasks). In this example, the processor device (e.g., DSP devices 205a and 205b) may (each) include an operating system implemented as master firmware to interface between the hardware (and ISA) of the processor device (e.g., 205a,b) and software kernels (e.g., 290a,b) run using the processors (e.g., 205a,b).

As introduced above, computer vision logic may be implemented in software and/or hardware logic to perform or facilitate the performance of computer vision and deep learning tasks, which could be applicable to an inner-product convolutional neural network accelerator. In some implementations, a computer vision engine (CVE) may be provided that accelerates computer vision and deep-learning tasks. In one example, the CVE may expose a vision acceleration API 282 (e.g., an openVX or other API) to express a computer vision or deep learning algorithm in the form of a graph and it can also execute inference of trained deep-learning networks, among other example features. For instance, through the use of a graph-compiler (e.g., 284), potentially any computer vision, deep learning, or other graph can be compiled to native CVE code (e.g., implemented as a kernel (e.g., 290a,b)) and sent for execution (e.g., by DSPs 290a or 290b, etc.). The compiler 284 may build an efficient pipeline inside the CVE hardware, where different compute building blocks (e.g., fixed functions (e.g., 276 or digital signal processing (DSP) kernels (e.g., 290a,b)) process the data according to the graph topology defining a corresponding user application (e.g., 270). A CVE may also enable users to implement custom kernels for the embedded DSP inside CVE in such a way that they can be made part of an efficient compiled pipeline.

In one example, the main programming API 282 of CVE for external developers may use a graph-based language to describe workloads or algorithms for accelerators. For instance, the CVE may expose the API 282 to application developers by which an algorithm can be defined and sent for execution. Defining workloads as a graph may involve representing underlying algorithms of the workloads as nodes and data passing as vertices.

Returning to FIG. 2c, in some implementations, an API (e.g., 282) may be provided through which user-nodes may be included in a graph algorithm to be utilized within a computing device. Although API 282 is illustrated here as a user space element, it should be noted that API 282 can exist in any suitable privilege ring, including in the driver space or kernel space, as appropriate to the embodiment. In some implementations, user-node kernels provided in such a graph may not be executed inside a corresponding computer vision or deep learning hardware accelerator, but rather on the host processor itself. In such instances, whenever the corresponding program (e.g., application) is using a user-node as part of the graph, the corresponding data may be streamed out from the accelerator into the host memory 250, where a user-node implementation would process it, and then stream it back into the accelerator. Traditional implementations, such as this, are costly in terms of both bandwidth and performance given the back and forth between the accelerator and host processor 245. In an improved example implementation, such as illustrated in FIG. 2c, custom-defined user nodes may be implemented as a native DSP kernel (e.g., 290a, 290b) that is executed inside an implementation of a CVE and schedulable by the CVE graph-compiler 284. Accordingly, in such implementations, a CVE can expose two levels of programmability: a native level allowing application developers to use graph notation to code an algorithm, based on pre-defined (e.g., specification-defined) nodes such as "upscale", "erode", "extract channel," etc.; and kernel authoring (e.g., using API 282) such that a developer (or other source) can add a new node "type" to the CVE system by providing the corresponding specific DSP implementation (e.g., implemented to the respective ISAs of DSPs 205a-b, etc.). Developers may then create graphs compatible with the CVE that contain the new, custom node types and pre-defined node types.

As further illustrated in the example of FIG. 2c, an example CVE may additionally include components and functionality, including a direct memory access (DMA) block (e.g., 278) (which may be utilized to move data between the accelerator and main system memory), memory management unit (MMU) block (e.g., 280), with an interface between the user space and the CVE accelerator (e.g., 240) provided through memory mapped I/O (MMIO) interface 294, among other examples. In an implementation, utilizing a graph-based application through the CVE accelerator, the system may additionally include a driver user mode library 286 and kernel driver 292 to funnel the graph from the high level application definition to the accelerator, with the graphic compiler translating the graph into the ISA instructions and call provided through the accelerator processors, among other example implementations.

An example CVE may include one or more compute building blocks (CBBs). These CBBs may include fixed functions 276 embedded within the CVE, embedded DSP functions, and kernels (e.g., 290a-b) run on the DSPs 205a-b, among other examples. In one example, a set of base algorithms may be implemented through the fixed-functions CBBs 276, with extended (and even custom) implemented as kernels 290a-b, running on the embedded DSPs 290a-b. In one example implementation, all CBBs of the CVE 240 may be connected to one shared-memory 225 (e.g., SRAM) and control network facilitated, for example, by controller 275 and kernel driver 292, among other example implementations. CBB consumers and producers may exchange tokens to signal "data ready" over the control network, according to the graph-compiler 284 decisions. Accordingly, in some implementations, the CVE may be implemented using processor cores 205a-b that may be adapted to have their hardware extended with logic, states, and new ISA instructions/extensions. In other cases, the CVE may be purpose-built with a microarchitecture and corresponding ISA (of DSPs 205a-b), among other example implementations.

Allowing user nodes to be treated as native nodes within an example CVE system may demand that the developers of these custom nodes have an expert understanding of the underlying CVE microarchitecture. In some implementations, aspects of the microarchitecture may be abstracted away to allow easy ramp up and development by developers. By abstracting away details of the microarchitecture, the developer may instead focus attention on the nuances and optimization of the algorithm being developed, rather than understanding and coding to the specific infrastructure features provided through the microarchitecture, such as data movement, configuration and parameter passing, nature of buffers in the CVE local memory (e.g., static random access memory (SRAM), among other examples. As one example, an improved microarchitecture and corresponding instruction set architecture (ISA) may be provided to enable a graph-compiler (e.g., of a CVE) to understand the prerequisites to efficiently scheduling a customer kernel as part of a pipeline and how to efficiently execute it in runtime along with the rest of the graph. Further, a turn-key solution (such as a software development kit (SDK) corresponding to devices implementing the improved microarchitecture) may be provided to assist developers in building kernels and kernel-libraries that are pluggable into a device (e.g., CVE) and easily deployable to their market, among other example features. For instance, attributes of the architecture may be effectively abstracted from the developer, such as the nature of buffer size and management of wraparound events, among other examples. Without such a mechanism (as in traditional systems), a developer may be forced to be familiar with the address and size of each of the buffers as well as the current pointer where the current tile for processing is allocated. As an example, the following example piece of simple kernel code represents the complexity of traditional code used when buffers and buffer management are not abstracted:

```
vec_type *sptr = BUF_PTR(BUFFER0);      //sptr is state pointer
vec_type *sbase = BUF_BASE(BUFFER0);    //sbase is base point
uuint32_t ssize = BUF_SIZE(BUFFER0);    //buffer size define
for (y=0; y < height; y++)
{
    for (x=0; x < width; x++)
        temp += ~ vec_load(sptr,64);    //vec load with
    increment
    if (sptr > sbase + ssize) sptr -= ssize;
}
```

The generated code (above) is both branchy and costly in assembly operations, costing a large (e.g., ~10 or more) amount of cycles just to perform buffer management. In cases where an example kernel is provided that is to work with multiple different buffers, the performance penalty is only magnified further.

An example mechanism, implemented through an example microarchitecture and corresponding instruction set, may implement various API extensions, including APIs that may be accessed by a kernel to allow pointers to be explicitly updated and fixed. For instance, an API call FixedPtr may be provided which may be translated into a single assembly operation (e.g., CVE_UPDATE_PTR(Ptr, Offset) that may update and fix the pointer (e.g., in a single cycle or less, in VLIW). For instance, through FixedPtr=CVE_UPDATE_PTR(Ptr,Offset), the processor device may internally calculate Ptr+=Offset, identify whether fixing of Ptr is needed, and performs the fixing to point correctly without any explicit direction from the software code (e.g., kernel code). As another example, the API may further define and include calls enabling an implicit overloaded load/store operation combined with pointer post-increment and fixing. For instance, the block may support a set of load/store operations that may be performed using only a single assembly operation to perform a sequence of (a) load/store from/to a pointer, (b) post-incrementing of the pointer according to a corresponding offset, and (c) fixing the pointer, after the post-increment operation. For instance, an intrinsic function may be defined for the processor, such as CVE_LVNX8S_XCP v0, Ptr, diff, which loads a vector from Ptr into v0 and then would update and fix Ptr as needed in a single operation.

In accordance with the above, a processor device 205 may be provided with or extended to support an instruction set architecture. For instance, firmware (or an operating system implementation (e.g., 215) of a processor device (e.g., 205)) may be provided that runs on the processing core and makes use of this ISA. The firmware may additionally expose an abstracted kernel development API, as well as perform other management of the processing core. As examples, the ISA (or ISA extensions) used by the firmware may include instructions to program or define a buffer (or context) with a particular parameter, generating a pointer for a kernel (e.g., as part of a buffer pointer API implementation), and perform fast context switching of the hardware state. An ISA function that defines a buffer may further set the hardware state of the processing core (e.g., DSP) and set the foundation for enabling the remaining provided for in the ISA. Fast context switching provided within the ISA may be used to read and write the configured HW state from/to the SRAM to change the context (e.g., as the processing core toggles between kernels during operation). For instance, firmware of the processing core may perform such a context switch every time it calls a different kernel along the execution of the graph of a particular application, among other example features.

Figure 3A:
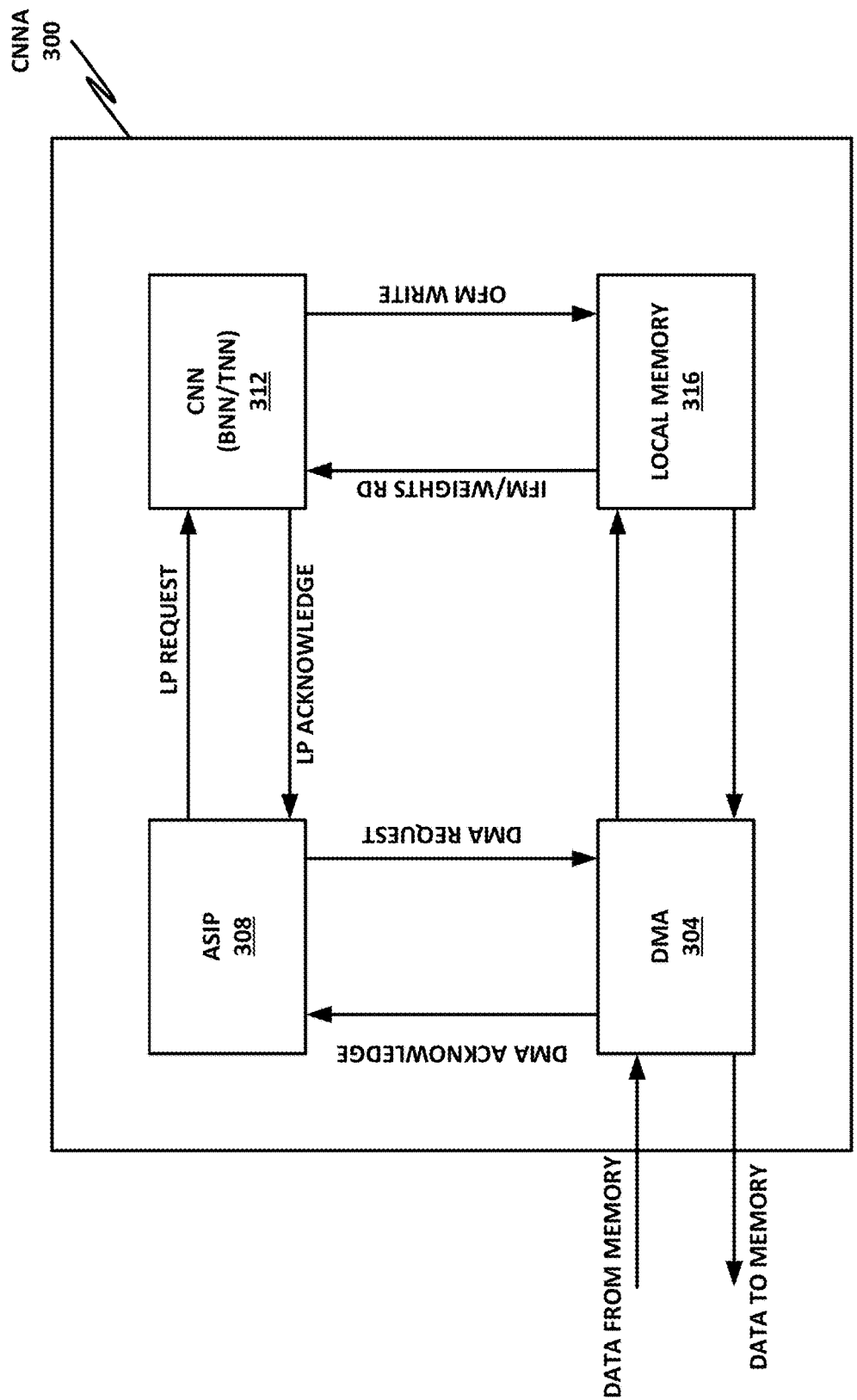
FIG. 3a is a block diagram of a convolutional neural network accelerator (CNNA) block, according to one or more examples of the present specification.

FIG. 3a is a block diagram of a convolutional neural network accelerator (CNNA) block 300, according to one or more examples of the present specification. CNNA 300 may be part of a larger system, as illustrated for example in FIG. 2b, where CNNA 242 is part of machine learning accelerator 240. CNNA 300 could also be a standalone module that works as a separate coprocessor or other unit of a larger system. CNNA 300 may be embodied in various examples as an integrated circuit, an IP block, or any combination of hardware and software to appropriately carry out the functions disclosed herein. In this example, CNNA 300 includes an ASIP 308, a CNN 312, a local memory 316, and a DMA 304.

In this example, ASIP 308 is a programmable core that can be used to control the various tasks involved with execution of a neural network layer. ASIP 308 as described above may include some underlying CPU logic providing standardized instructions, and may also include a configurable portion that has instructions specific for use with CNN 312.

In an example, ASIP 308 issues a DMA request to DMA 304, to fetch data from main memory. Data from main memory comes in to DMA 304, and DMA 304 may write the data to local memory 316. Once data are stored in local memory 316, ASIP 308 may issue an LP request to CNN 312 to execute a tile within the layer.

CNN 312 issues a read request to local memory 316 and receives the IFM and weight matrices from local memory 316. CNN 312 then applies an inner product to the IFM and weight matrices and accumulates the result. At the end of the operation, it writes the final results of the convolution back to local memory 316 as OFM write.

Figure 3B:
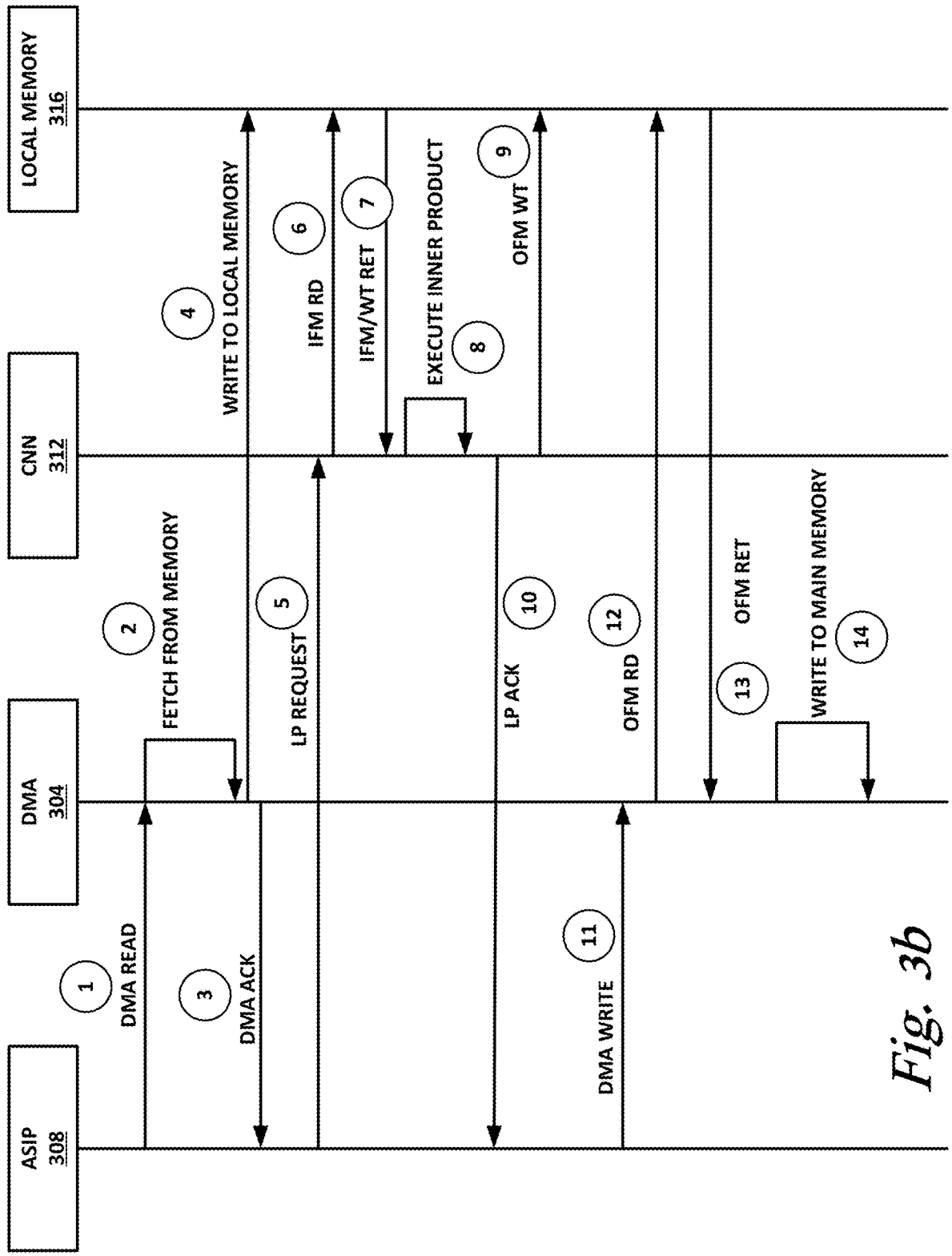
FIG. 3b is a signal flow diagram illustrating an example operation for carrying out a convolutional neural network (CNN) computation, according to one or more examples of the present specification.

As illustrated in FIG. 3b, at operation 1 ASIP 308 issues a DMA read to DMA 304. This is a read request to fetch data from main memory with a CNN tile so that it can be used from local memory.

In operation 2, DMA 304 fetches the requested data from main memory, and in operation 3 returns a DMA ACK to ASIP 308.

In operation 4, DMA 304 writes the requested tile to local memory 316.

In operation 5, ASIP 308 issues an LP request to CNN 312 for execution of the tile within a layer.

In operation 6, CNN 312 issues a read request to local memory 316, and in operation 7, local memory 316 returns the IFM and weight matrix.

In operation 8, CNN 312 executes the inner product according to methods disclosed herein.

In operation 9, CNN 312 issues an OFM write to local memory 316 to write the result of the operation back to local memory 316.

In operation 10, CNN 312 may also issue an LP ACK to ASIP 308 to indicate that the convolution was successfully performed.

Now that ASIP 308 knows that the convolution has been successfully performed, it will move the OFM back into main memory. In operation 11, ASIP 308 issues a DMA write to DMA 304.

In operation 12, DMA 304 issues a read to local memory 316 to read out the OFM.

In operation 13, local memory 316 returns the requested OFM to DMA 304. In operation 14, DMA 304 writes the OFM out to main memory.

These steps are repeated until the entire layer has been covered and calculated.

Figure 4A:
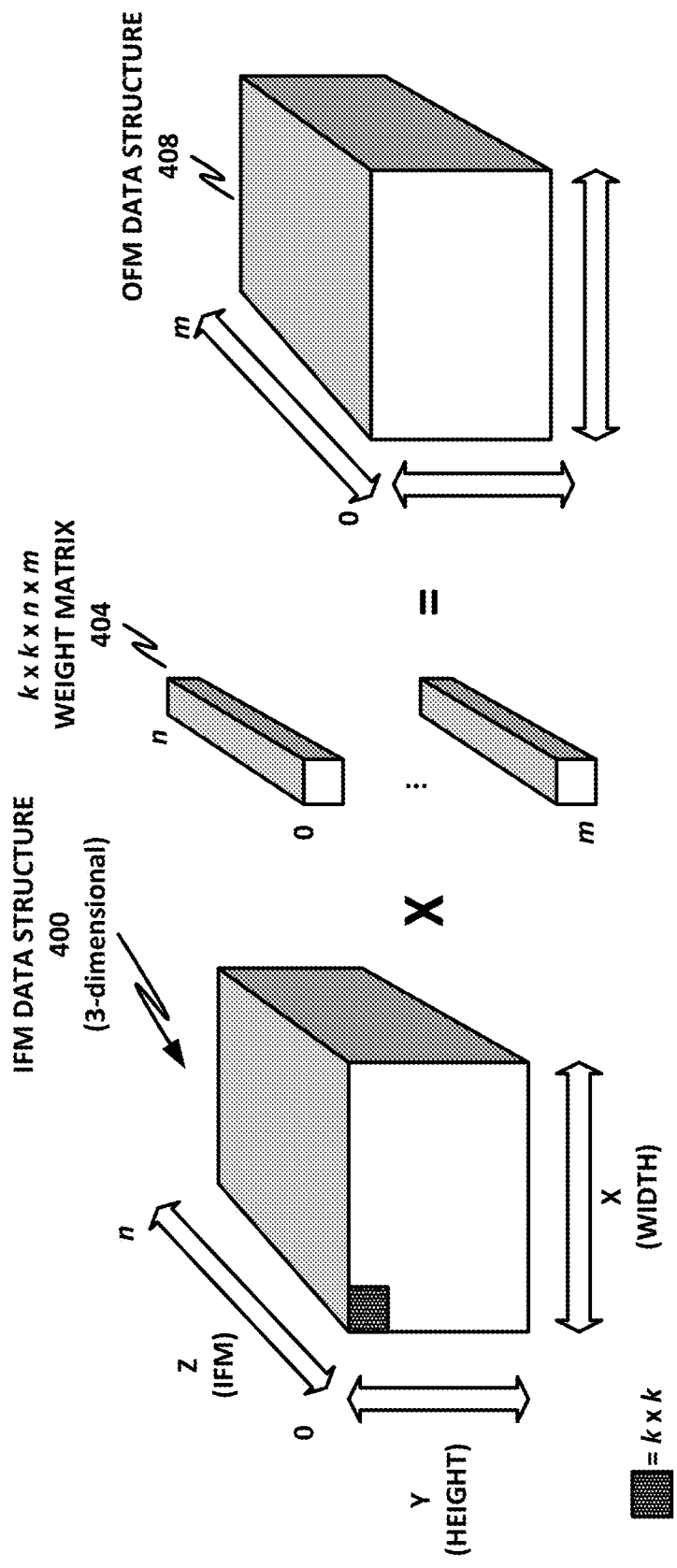
FIGS. 4a-4c are block diagrams illustrating the organization of matrices in memory, according to one or more examples of the present specification.
Figure 4B:
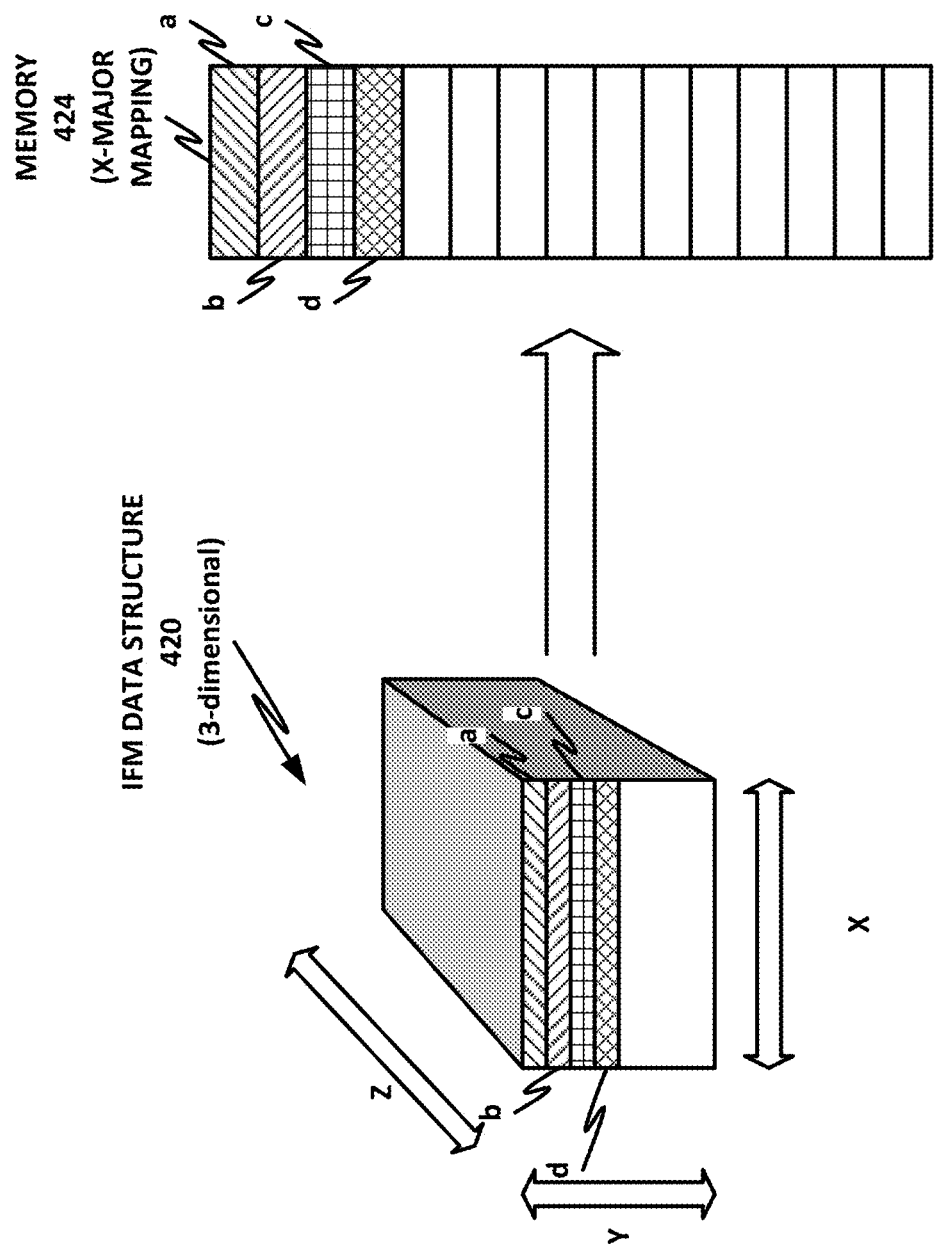
Figure 4C:
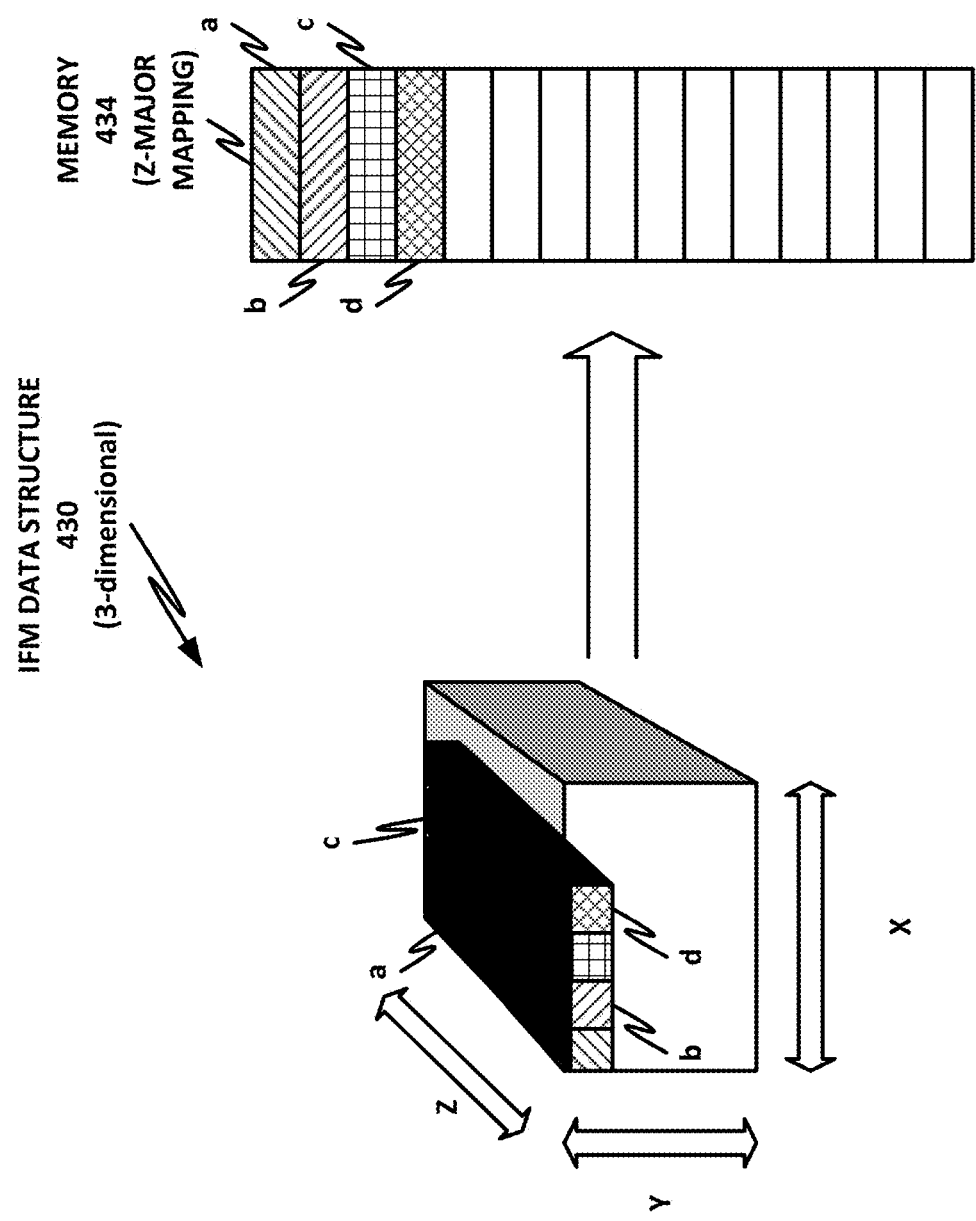

FIGS. 4a-4c are block diagrams illustrating the organization of matrices in memory, according to one or more examples of the present specification.

Note that certain advantages of the present specification are realized by organizing memory in a fundamentally different way from certain existing accelerators.

In FIG. 4a, an IFM data structure 400 is illustrated. IFM data structure 400 is a three-dimensional structure with an X axis (width), a Y axis (height), and a Z axis (IFM). Thus, IFM data structure 400 may be thought of as an array of X by Y planes, with the number of planes or slices in the data structure being n−1, so that the individual planes are numbered from 0 to n. Each individual plane of IFM data structure 400 may include a number of individual tiles of size k×k as illustrated in the FIGURE.

IFM data structure 400 is convoluted via matrix multiplication with a weight matrix array 404. Weight matrix array 404 is a 4-dimensional array of size k×k×n×m. In other words, each three-dimensional weight structure in weight matrix 404 is the same size and depth as a single tile from IFM data structure 400. Weight matrix 404 includes a total of m such tiles, wherein m is the depth of OFM data structure 408. Note that in some embodiments, n and m may be the same size, while in other embodiments they could be different sizes. Once IFM data structure 400 has been fully convoluted with weight matrix 404, the result is OFM data structure 408, which then becomes the input to the next layer.

FIG. 4b illustrates an IFM data structure 320 which as before is a three-dimensional IFM data structure. In the example of FIG. 4b, IFM data structure 420 may be mapped to memory 424 in a so-called X-major mapping. X-major mapping means that sequential rows along the X axis are stored sequentially in memory 424. Stated otherwise, row A is stored, followed by row B, followed by row C, followed by row D, and so on.

While this is a natural mapping for IFM data structure 420, if data are stored in this way, then the convolution operation illustrated in FIG. 4a will need to be followed by a lowering operation to yield the correct OFM data structure.

FIG. 4c illustrates an alternative method of orienting data within a memory 434. In this case, IFM data structure 430 is also a three-dimensional IFM. However, IFM data structure 430 is mapped to memory 434 in a Z-major mapping. This means that rather than rows along the X axis being mapped sequentially in memory, in this case tiles along the Z axis are mapped sequentially. Thus, tile array A maps to a first memory location, tile array B maps a second memory location, tile array C maps to a third memory location, tile array D maps to a fourth memory location, and so on.

In embodiments of the present specification, Z-major memory mapping can be accomplished by rotating all three dimensions of the IFM data structure from its original X-major mapping. Advantageously, when the inner product is performed according to a Z-major mapping, no lowering operation is required to put the OFM in the desired format. In a Z-major orientation, elements along the Z dimension are consecutive in memory. This organization allows the efficient sum of products between IFM and weight vectors along the Z dimension, where the result can be stored in a single accumulator.

Figure 5:
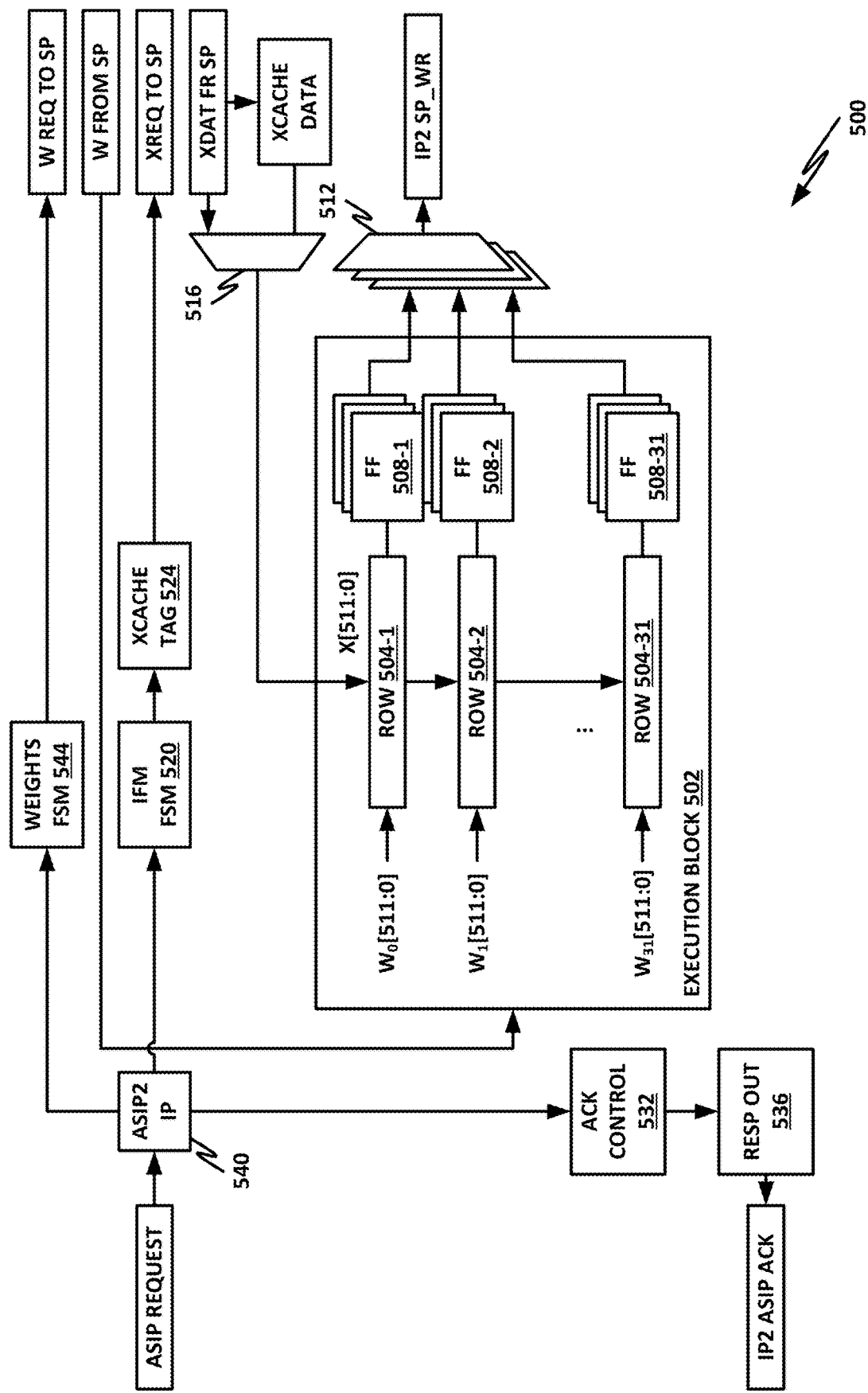
FIG. 5 is a block diagram of a convolutional neural network (CNN), according to one or more examples of the present specification.

FIG. 5 is a block diagram of a CNN 500, according to one or more examples of the present specification. In this example, CNN 500 receives an ASIP request that instructs the CNN to perform the operation. In block 540, the ASIP instruction is converted to an IP.

The ASIP instruction to IP block 540 builds an IFM FSM 520 which populates an xcache tag 524. This sends a request to the SP for the X data. ASIP to IP also populates the weights FSM block 544, which sends a request to SP for the weights data. X data and weight data are received from the SP, while multiplexer 516 selects from the X data or xcache data, thus enabling CNN 500 to execute the sum of products on the current weight vectors, while loading the next weight vectors. Weights from SP and X data from multiplexer 516 are provided as inputs to execution block 502.

Note that CNN 500 could be a high precision neural network, or could be a lower precision neural network such as an INT1 or INT2 network. Because a 1-bit neural network represents two values, it may be referred to as a binary neural network (BNN), while a ternary neural network may have three values, namely −1, 0, or +1. A ternary neural network can be represented with 2 bits. Other possible neural networks include INT8 (8-bit integer), FP16 (16-bit floating point), or any other suitable bit width or notation.

By way of illustrative example, CNN 500 executes 32 different inner products between vectors of 512 elements. There are 32 rows where each row gets a preloaded weight (W0 through W31, each of which is 512 bits wide). The IFM vector X, which is also 512 bits wide by way of illustrative example, is also an input to CNN 500. Each row produces a single number, the sum of the products of elements in that vector.

Note that the same 32 vectors of weights are multiplied with 32 different IFM vectors to produce 32 OFMs. Furthermore, the next 32 weight vectors are loaded in while the CNN is executing the current weight vectors. This organization allows full utilization of the execution block and each row within it.

Because the operation is a convolution between IFMs and weights, the same IFM data are read from local memory into the accelerator more than once. To minimize the read traffic from local memory, IFM lines of data that were previously read may be cached (xcache) for future reuse.

Each row in the execution block of CNN 500 is capable of executing a sum of products between two vectors (namely the weight vector and IFM vector). The outputs of each row are accumulated in flip-flops (FFs) 508 and written out as IP2 SP write.

Finally, execution block 502 provides an acknowledgment in block 532, and an output response.

Figure 6:
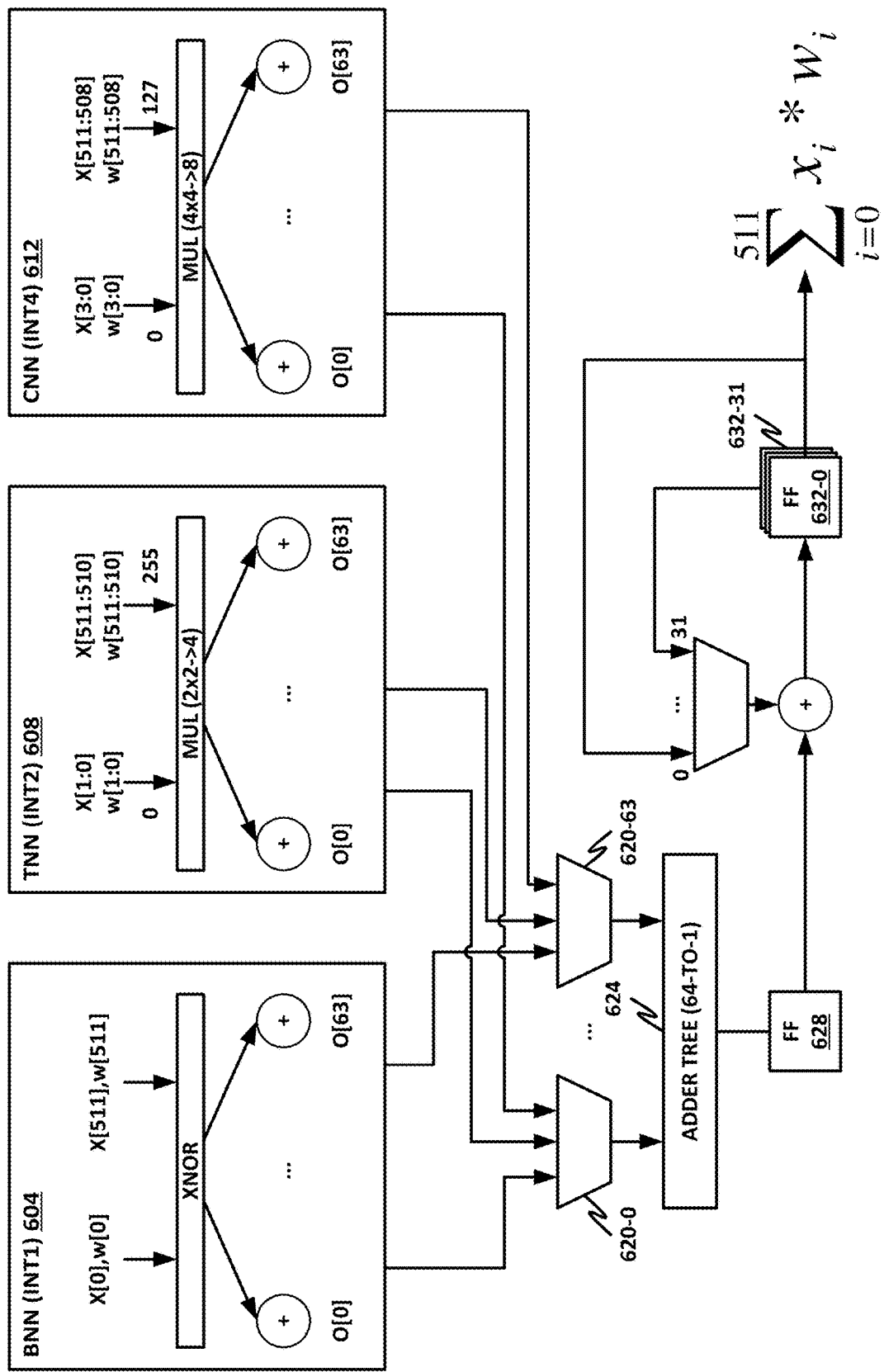
FIG. 6 is a block diagram illustrating an example of how the rows in an execution block of a CNN may be instantiated, according to one or more examples of the present specification.

FIG. 6 is a block diagram illustrating an example of how the rows in execution block 502 of CNN 500 may be instantiated.

This example provides a BNN (INT1) 604, a TNN (INT2) 608, and a CNN (INT4) 612.

Each row in the execution block is capable of executing a sum of products between two vectors, namely the weight vector and IFM vectors. In this example, there is dedicated logic to perform the elementwise operations for each data type. Namely, for INT1, INT2, and INT4.

As illustrated, for INT1 and INT2, the operation is a simple logic operation. Namely, an array of 512 inputs and 512 weights are convoluted via a simple exclusive-NOR (XNOR) operation. The outputs are 64 groups of 8 operands of size INT1, which are summed into a 64-bit output.

In the case of TNN 608, a two-bit multiply yields a 4-bit output. In this case, rather than 512 elements, there are 255 2-bit elements. The outputs are grouped into 4 operands of INT2, each. Once again these are summed, yielding a 64-bit output.

In the example of CNN 612, which in this example is an INT4 CNN, the logic is a 4-bit multiplier yielding an 8-bit result.

In the case of CNN 612, the outputs are grouped into two operands of INT8 which are once again added, yielding a 64-bit output.

An array of multiplexers 620-0 through 620-3 select the outputs from one of BNN 604, TNN 608, or CNN 612. The proper output bits are thus fed to adder tree 624, which is a 64-to-1 adder tree.

The output of adder tree 624 is accumulated in FF 628.

This is added to the sum of products accumulated in FFs 632-0 through 632-31. Thus, the row calculates the sum for:

$$\sum_{i=0}^{511} X_i * W_i$$

This organization allows support for multiple low precision datatypes while sharing most of the logic.

One quality metric in a neural network is the accuracy of the topology. In other words, what percentage of the time the topology predicts the results correctly according to the inputs. When moving to low precision topologies, the accuracy may deteriorate to an acceptable point. One solution is to dynamically assign different data types for each layer in the topologies. This assignment may be optimized for accuracy and efficiency. Because of the organization of IFMs in memory according to this specification (namely, Z-major) along with the use of an inner product, moving between different low precision datatypes is possible. Some existing CNNs may need to perform data manipulation between layers to perform such shifting between different data types.

However, according to the teachings of the present specification, there is no need for an intermediate data manipulation stage. The output of one layer can become an input to the next layer without any additional data manipulation, in some embodiments.

The CNN accelerator block of the present specification illustrates 32 rows of 512 elements with an inner product accelerator. In one embodiment, a single multiplier-accumulator (MAC) can be used to accumulate 16,000 operations for a 1-bit weight per cycle. Setting the accelerator capability to a higher or lower peak operation is possible while keeping the internal operation without change. This can be done by setting the number of rows while keeping each row to handle elements in a cache line (i.e., 512 elements of INT1, 256 elements of INT2, or 128 elements of INT4).

As discussed above, embodiments of this specification may include low precision neural networks, in which the weight matrix may be reduced to a low precision weight matrix such as INT1, INT2, or INT4. In some embodiments, the IFM may also be reduced to a low precision matrix.

Figure 7:
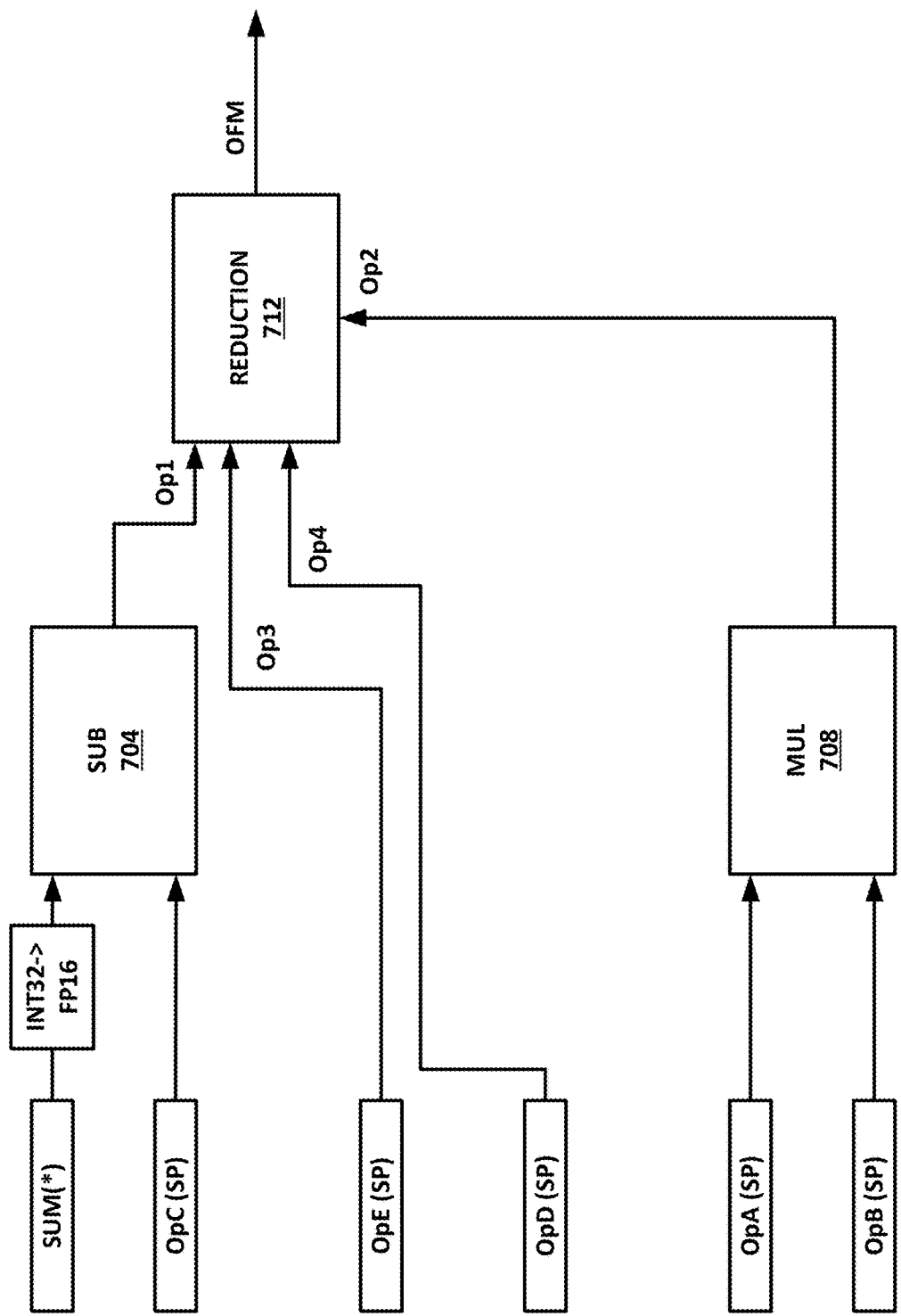
FIG. 7 is a block diagram illustration of a reduction operation, which may reduce a 16-bit floating point to a 1 or 2-bit output, according to one or more examples of the present specification.

FIG. 7 is a block diagram illustration of a reduction operation, which may for example reduce a 16-bit floating point to a 1 or 2-bit output. Embodiments of the disclosed operation may be configurable so that the operations between operands and sum(*) can be configured to perform a function. Inputs to the operation include sum(*), as well as operand C, operand E, operand D, operand A, and operand B. Operands A through E may be, for example, 16-bit floating point, whereas sum(*) may be a 32-bit integer. Thus, the sum(*) input may be converted from a 32-bit integer to a 16-bit floating point to maintain consistency with the other inputs. In this example, operands A and C are in "vector" layout. Operands E and D are in vector layout per OFMz. Operand B may be in plane layout.

The process receives the 16-bit floating point numbers ("half precision") and produces 1 or 2-bit integer outputs. There are four operands, and up to three operands can be configured. Operand 1 is the result in block 704 of taking the difference of sum(*) and operand C. Operand 3 is a direct pass-through of operand E. Operand 4 is a direct pass-through of operand D. Operand 2 is the result of multiplying in block 708 operand A and operand B. This is then provided to a reduction block 712, the output of which is an OFM in the desired low precision format such as INT1 or INT2.

Reduction block 712 may use any suitable method, including, by way of nonlimiting example, bit select (INT32→INT1/INT2) or quantization.

In the bit select method, one or more digits of the accumulator (an FP16 number) is selected. In this case, only Op1 need be used as an input. For INT1, a configurable field may select one of the 16 digits. For INT2, two configurable fields may select one of the 16 digits, one for each bit of the 2-bit integer. For example, to apply a sign bit reduction, bit15 may be used to reduce to INT1. Thus, this single bit simply reduces the input to being either positive or negative.

In a quantization method, greater flexibility is provided. Quantization may include more than one operand. Using a quantization method, the entire range may be split into two (for INT1) or three (for INT2) ranges. The number is reduced based on the location of the input within the range.

For example, in one range operation, Op1 is compared to Op2 to describe the range. If Op1 is less than Op2, then a value of +1 may be assigned to the output. If Op1 is greater than Op2, then a value of −1 may be assigned. The opposite could also be true. If Op1 is less than Op2, a value of −1 could be assigned, while if Op1 is greater than Op2, a value of +1 could be assigned. Thus, these two configurable values can be used to provide the desired ranges.

Op1 is compared to Op2 and Op3. This splits the range into three consecutive spaces. Each OFM is assigned a value of −1, 0, or +1 based on the result of this comparison.

A similar method can be used for INT2 operations for a TNN. In this case, if Op1 is less than Op3, then a value of +1 may be assigned. If Op3 is between Op1 and Op2, then a value of 0 may be assigned. If Op2 is greater than Op1, then a value of −1 may be assigned. As before, the signs and designations can be changed.

Note that for both INT1 and INT2, the results of comparison may show a fixed assignment of OFM values. But as discussed above, these ranges can be switched and the sign of the values can be changed as discussed above.

In some embodiments, the indication of whether a value is switchable is provided per map and therefore may be considered as another operand, namely the "vector layout" operand.

As illustrated in FIG. 7, Op1, Op2, Op3, and Op4 are generated from OpA, OpB, OpC, OpD, and OpE.

Op1 is the output of an operation between sum(*) and OpC. The operation can be configured to the sub as in block 704, or NONE. With a NONE operation, Op1 equals sum(*), and OpC is therefore not necessary.

As described above, Op3 and Op4 are simply passthroughs of OpE and OpD, respectively.

As with sub block 704, multiply block 708 provides Op2 as its output. As before, the operation of block 708 may be specified as multiply or NONE between OpA and OpB. Because this is a multiply operation between a vector and a plain operand, Op2 receives a unique number for each and every OFM. This may be viewed as a decompression operation wherein OpA and OpB are compressed values. In the case that this operation is configured to NONE, Op2 equals OpA, and OpB is not necessary. In this case, each map gets a unique number as described above.

Figure 8:
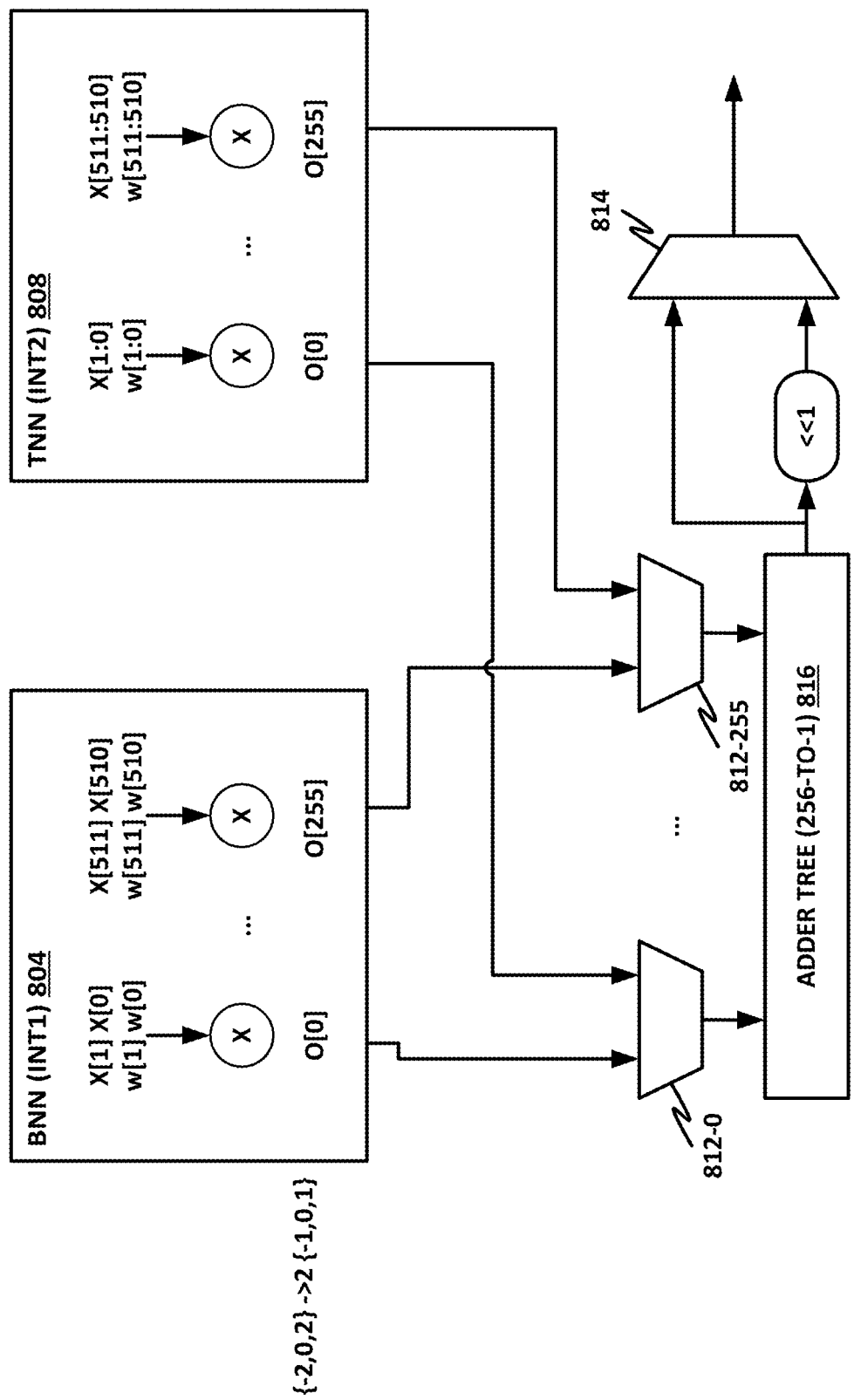
FIG. 8 is a block diagram illustrating that a BNN and TNN may share a common adder tree based on a simple mathematical factoring operation, according to one or more examples of the present specification.

FIG. 8 is a block diagram illustrating that in certain embodiments of the present specification, a BNN and TNN may share a common adder tree based on a simple mathematical factoring operation.

In the case of an INT1 operation between two operands X and W, a truth table may be defined as follows:

| X | W | Out |
|---|---|---|
| −1 | −1 | +1 |
| −1 | +1 | −1 |
| +1 | −1 | −1 |
| +1 | +1 | +1 |

The above illustrates an elementwise operation, wherein the sum of two products is the set {−2, 0, +2}.

For an INT2 operation for a ternary neural network, the truth table may be defined as follows:

| X | W | Out |
|---|---|---|
| −1 | −1 | +1 |
| −1 | 0 | 0 |
| −1 | +1 | −1 |
| 0 | −1 | 0 |
| 0 | 0 | 0 |
| 0 | +1 | 0 |
| +1 | −1 | −1 |
| +1 | 0 | 0 |
| +1 | +1 | +1 |

The result of products between these two elements is of the set {−1, 0, +1}.

Two adjacent INT1 elements are fused into a single elementwise operation where the result is {−2, 0, +2}. But the elementwise logic of the two adjacent INT1 elements may be simplified to a product of 2 times {−1, 0, +1}. Since the possible number produced in this case is equal to the product of INT2 (i.e., {−1, 0, +1}), both outputs may be sent to the same adder tree. In the case of INT1, the final result of the adder tree may simply be shifted left by one, thus redistributing the 2 that was factored out back into the product value of the operands. This is illustrated in FIG. 8, in which a BNN 804 and TNN 808 both provide 256 output bits. This solution may be generalized to provide a common adder tree for any set of two or more convolution elements whose output ranges vary only by a multiplicative factor.

The 512-bit input may be handled via 256 adds by using, for example, a shared adder tree. For example, a half adder may be used, which may simply include a 4-to-1 multiplexer that is supplied by two adjacent bits X0 and X1, with the weight value W operating as the selection logic. In this case, weight value W may select between 0, X0, X1, and X0 plus X1, and the output may be provided as the output of the add operation. This reduces the number of necessary adders by half.

BNN 804 and TNN 808 represent elementwise operations for INT1 and INT2. As discussed above, the elementwise operations for INT1 have a product of {−2, 0, +2}, and its logic involves an adder. But the 2 may be factored so that the product can be represented as 2 times {−1, 0, +1}, and involving logic gates.

The 256 output bits of BNN 804 and TNN 808 may be provided to an array of multiplexers 812, which may be controlled by a common signal indicating whether the input from the BNN 804 or the input from TNN 808 should be selected. The selected input is provided to shared adder tree 816, which in this example is a 256-to-1 adder tree. The output of this is the output of the individual row. As illustrated here, a multiplexer 814 may be used to select from between the direct output, or from the output left shifted by one bit, representing multiplication by 2. In the case of TNN 808, multiplexer 814 selects the direct output. In the case of BNN 804, multiplexer 814 selects the left shifted output as the output of the row.

The following FIGS. 9a-19 illustrate one or more examples of hardware, software, and integrated systems that may benefit from the use of a CNN as described in the foregoing figures and description. For example, any of the systems of FIGS. 9a-19 may be provided with a CNN co-processor, accelerator, or other cooperative hardware or software element that realizes the teachings of FIGS. 1-8, to provide computer intelligence or a computer vision system.

In certain examples, instruction(s) may be embodied in a "generic vector-friendly instruction format," which is detailed below. In other embodiments, another instruction format is used. The description below of the write mask registers, various data transformations (swizzle, broadcast, etc.), addressing, etc. is generally applicable to the description of the embodiments of the instruction(s) above. Additionally, example systems, architectures, and pipelines are detailed below. Embodiments of the instruction(s) above may be executed on those systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode)

and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are fewer fields included) and/or defined to have a given field interpreted differently. Thus, each instruction of an ISA is expressed using a given instruction format (and, if defined, in a given one of the instruction templates of that instruction format) and includes fields for specifying the operation and the operands. In one embodiment, an example ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the advanced vector extensions (AVXs) (AVX1 and AVX2), and using the vector extensions (VEX) coding scheme has been released and/or published (e.g., see Intel® 64 and IA-32 Architectures Software Developer's Manual, September 2014; and see Intel® Advanced Vector Extensions Programming Reference, October 2014).

Example Instruction Formats

Embodiments of the instruction(s) described herein may be embodied in different formats. Additionally, example systems, architectures, and pipelines are detailed below. Embodiments of the instruction(s) may be executed on such systems, architectures, and pipelines, but are not limited to those detailed.

Generic Vector-Friendly Instruction Format

A vector-friendly instruction format is an instruction format that is suited for vector instructions (e.g., there are certain fields specific to vector operations). While embodiments are described in which both vector and scalar operations are supported through the vector-friendly instruction format, alternative embodiments use only vector operations through the vector-friendly instruction format.

Figure 9A:
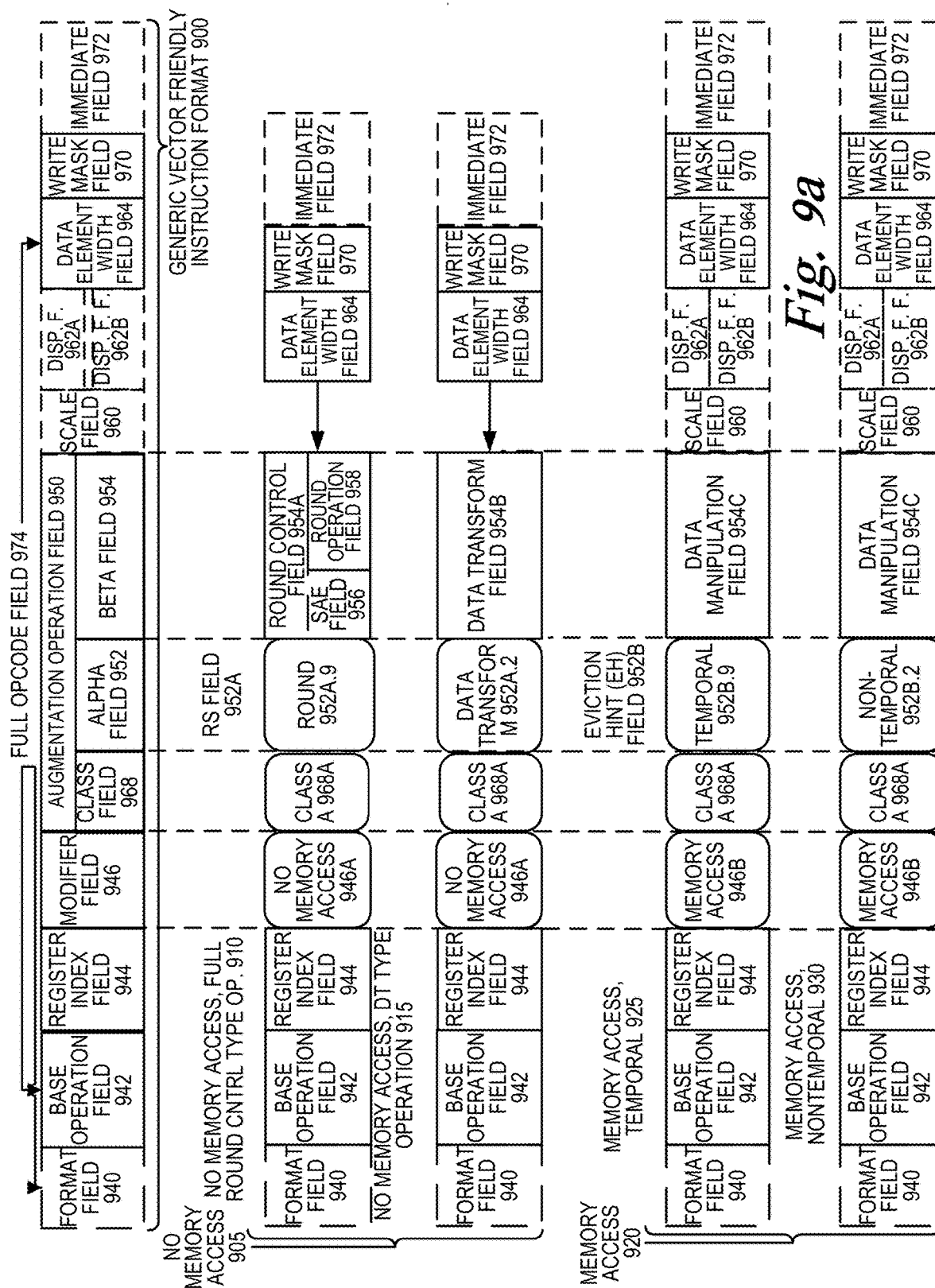
FIGS. 9a-9b are block diagrams illustrating a generic vector-friendly instruction format and instruction templates thereof, according to one or more examples of the present specification.
Figure 9B:
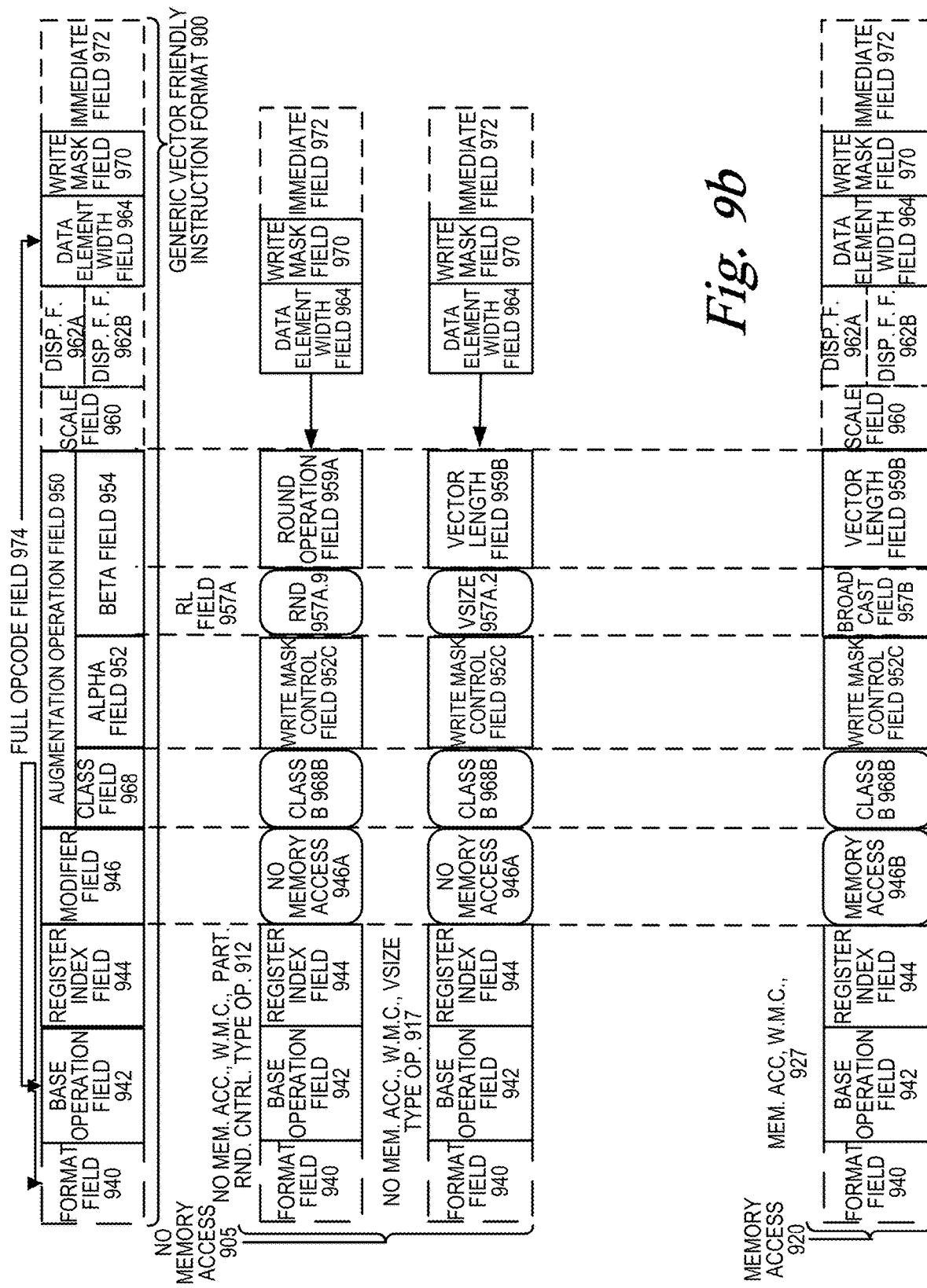

FIGS. 9a-9b are block diagrams illustrating a generic vector-friendly instruction format and instruction templates thereof according to embodiments of the specification. FIG. 9a is a block diagram illustrating a generic vector-friendly instruction format and class A instruction templates thereof according to embodiments of the specification; while FIG. 9b is a block diagram illustrating the generic vector-friendly instruction format and class B instruction templates thereof according to embodiments of the specification. Specifically, a generic vector-friendly instruction format 900 for which are defined class A and class B instruction templates, both of which include no memory access 905 instruction templates and memory access 920 instruction templates. The term generic in the context of the vector-friendly instruction format refers to the instruction format not being tied to any specific instruction set.

Embodiments of the specification will be described in which the vector-friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 9a include: 1) within the no memory access 905 instruction templates there is shown a no memory access, full round control type operation 910 instruction template and a no memory access, data transform type operation 915 instruction template; and 2) within the memory access 920 instruction templates there is shown a memory access, temporal 925 instruction template and a memory access, nontemporal 930 instruction template. The class B instruction templates in FIG. 9b include: 1) within the no memory access 905 instruction templates there is shown a no memory access, write mask control, partial round control type operation 912 instruction template and a no memory access, write mask control, VSIZE type operation 917 instruction template; and 2) within the memory access 920 instruction templates there is shown a memory access, write mask control 927 instruction template.

The generic vector-friendly instruction format 900 includes the following fields listed below in the order illustrated in FIGS. 9a-9b.

Format field 940—a specific value (an instruction format identifier value) in this field uniquely identifies the vector-friendly instruction format, and thus occurrences of instructions in the vector-friendly instruction format in instruction streams. As such, this field is optional in the sense that it is not needed for an instruction set that has only the generic vector-friendly instruction format.

Base operation field 942—its content distinguishes different base operations.

Register index field 944—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or fewer sources and destination registers (e.g., may support up to two sources where one of these sources also acts as the destination, may support up to three sources where one of these sources also acts as the destination, or may support up to two sources and one destination).

Modifier field 946—its content distinguishes occurrences of instructions in the generic vector instruction format that specify memory access from those that do not; that is, between no memory access 905 instruction templates and memory access 920 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, fewer, or different ways to perform memory address calculations.

Augmentation operation field 950—its content distinguishes which one of a variety of different operations to be performed in addition to the base operation. This field is context specific. In one embodiment of the specification, this field is divided into a class field 968, an alpha field 952, and a beta field 954. The augmentation operation field 950 allows common groups of operations to be performed in a single instruction rather than 2, 3, or 4 instructions.

Scale field 960—its content allows for the scaling of the index field's content for memory address generation (e.g., for address generation that uses $2^{scale}*$index+base).

Displacement Field 962A—its content is used as part of memory address generation (e.g., for address generation that uses $2^{scale}*$index+base+displacement).

Displacement Factor Field 962B (note that the juxtaposition of displacement field 962A directly over displacement factor field 962B indicates one or the other is used)—its content is used as part of address generation; it specifies a displacement factor that is to be scaled by the size of a memory access (N)—where N is the number of bytes in the memory access (e.g., for address generation that uses $2^{scale}*$index+base+scaled displacement). Redundant low-order bits are ignored and hence, the displacement factor field's content is multiplied by the memory operand's total size (N) in order to generate the final displacement to be used in calculating an effective address. The value of N is determined by the processor hardware at runtime based on the full opcode field 974 (described later herein) and the data manipulation field 954C. The displacement field 962A and the displacement factor field 962B are optional in the sense that they are not used for the no memory access 905 instruction templates and/or different embodiments may implement only one or none of the two.

Data element width field 964—its content distinguishes which one of a number of data element widths is to be used (in some embodiments, for all instructions; in other embodiments, for only some of the instructions). This field is optional in the sense that it is not needed if only one data element width is supported and/or data element widths are supported using some aspect of the opcodes.

Write mask field 970—its content controls, on a per data element position basis, whether that data element position in the destination vector operand reflects the result of the base operation and augmentation operation. Class A instruction templates support merging-write masking, while class B instruction templates support both merging and zeroing-write masking. When merging, vector masks allow any set of elements in the destination to be protected from updates during the execution of any operation (specified by the base operation and the augmentation operation)—in one embodiment, preserving the old value of each element of the destination where the corresponding mask bit has a 0. In contrast, when zeroing vector masks allow any set of elements in the destination to be zeroed during the execution of any operation (specified by the base operation and the augmentation operation), in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 970 allows for partial vector operations, including loads, stores, arithmetic, logical, etc. While embodiments of the specification are described in which the write mask field's 970 content selects one of a number of write mask registers that contains the write mask to be used (and thus the write mask field's 970 content indirectly identifies that masking to be performed), alternative embodiments instead or additionally allow the mask write field's 970 content to directly specify the masking to be performed.

Immediate field 972—its content allows for the specification of an immediate. This field is optional in the sense that is it not present in an implementation of the generic vector-friendly format that does not support immediate and it is not present in instructions that do not use an immediate.

Class field 968—its content distinguishes between different classes of instructions. With reference to FIGS. 9a-9b, the contents of this field select between class A and class B instructions. In FIGS. 9a-9b, rounded corner squares are used to indicate a specific value is present in a field (e.g., class A 968A and class B 968B for the class field 968 respectively in FIGS. 9a-9b).

Instruction Templates of Class A

In the case of the non-memory access 905 instruction templates of class A, the alpha field 952 is interpreted as an RS field 952A, whose content distinguishes which one of the different augmentation operation types are to be performed (e.g., round 952A.1 and data transform 952A.2 are respectively specified for the no memory access, round type operation 910 and the no memory access, data transform type operation 915 instruction templates), while the beta field 954 distinguishes which of the operations of the specified type is to be performed. In the no memory access 905 instruction templates, the scale field 960, the displacement field 962A, and the displacement scale filed 962B are not present.

No-Memory Access Instruction Templates—Full Round Control Type Operation

In the no memory access full round control type operation 910 instruction template, the beta field 954 is interpreted as a round control field 954A, whose content provides static rounding. While in the described embodiments of the specification the round control field 954A includes a suppress all floating point exceptions (SAE) field 956 and a round operation control field 958, alternative embodiments may encode both these concepts into the same field or only have one or the other of these concepts/fields (e.g., may have only the round operation control field 958).

SAE field 956—its content distinguishes whether or not to disable the exception event reporting; when the SAE field's 956 content indicates suppression is enabled, a given instruction does not report any kind of floating-point exception flag and does not raise any floating point exception handler.

Round operation control field 958—its content distinguishes which one of a group of rounding operations to perform (e.g., round-up, round-down, round-towards-zero and round-to-nearest). Thus, the round operation control field 958 allows for the changing of the rounding mode on a per instruction basis. In one embodiment of the specification where a processor includes a control register for specifying rounding modes, the round operation control field's 950 content overrides that register value.

No Memory Access Instruction Templates—Data Transform Type Operation

In the no memory access data transform type operation 915 instruction template, the beta field 954 is interpreted as a data transform field 954B, whose content distinguishes which one of a number of data transforms is to be performed (e.g., no data transform, swizzle, broadcast).

In the case of a memory access 920 instruction template of class A, the alpha field 952 is interpreted as an eviction hint field 952B, whose content distinguishes which one of the eviction hints is to be used (in FIG. 9a, temporal 952B.1 and nontemporal 952B.2 are respectively specified for the memory access, temporal 925 instruction template and the memory access, nontemporal 930 instruction template), while the beta field 954 is interpreted as a data manipulation field 954C, whose content distinguishes which one of a number of data manipulation operations (also known as primitives) is to be performed (e.g., no manipulation; broadcast; up conversion of a source; and down conversion of a destination). The memory access 920 instruction templates include the scale field 960, and optionally the displacement field 962A or the displacement scale field 962B.

Vector memory instructions perform vector loads from and vector stores to memory, with conversion support. As with regular vector instructions, vector memory instructions transfer data from/to memory in a data elementwise fashion, with the elements that are actually transferred as dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Nontemporal

Nontemporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 952 is interpreted as a write mask control (Z) field 952C, whose content distinguishes whether the write masking controlled by the write mask field 970 should be a merging or a zeroing.

In the case of the non-memory access 905 instruction templates of class B, part of the beta field 954 is interpreted as an RL field 957A, whose content distinguishes which one of the different augmentation operation types are to be performed (e.g., round 957A.1 and vector length (VSIZE) 957A.2 are respectively specified for the no memory access, write mask control, partial round control type operation 912 instruction template and the no memory access, write mask control, VSIZE type operation 917 instruction template), while the rest of the beta field 954 distinguishes which of the operations of the specified type is to be performed. In the no memory access 905 instruction templates, the scale field 960, the displacement field 962A, and the displacement scale field 962B are not present.

In the no memory access, write mask control, partial round control type operation 910 instruction template, the rest of the beta field 954 is interpreted as a round operation field 959A and exception event reporting is disabled (a given instruction does not report any kind of floating-point exception flag and does not raise any floating point exception handler).

Round operation control field 959A—just as round operation control field 958, its content distinguishes which one of a group of rounding operations to perform (e.g., round-up, round-down, round-towards-zero and round-to-nearest). Thus, the round operation control field 959A allows for the changing of the rounding mode on a per instruction basis. In one embodiment of the specification where a processor includes a control register for specifying rounding modes, the round operation control field's 950 content overrides that register value.

In the no memory access, write mask control, VSIZE type operation 917 instruction template, the rest of the beta field 954 is interpreted as a vector length field 959B, whose content distinguishes which one of a number of data vector lengths is to be performed on (e.g., 128, 256, or 512 byte).

In the case of a memory access 920 instruction template of class B, part of the beta field 954 is interpreted as a broadcast field 957B, whose content distinguishes whether or not the broadcast type data manipulation operation is to be performed, while the rest of the beta field 954 is interpreted by the vector length field 959B. The memory access 920 instruction templates include the scale field 960, and optionally the displacement field 962A or the displacement scale field 962B.

With regard to the generic vector-friendly instruction format 900, a full opcode field 974 is shown including the format field 940, the base operation field 942, and the data element width field 964. While one embodiment is shown where the full opcode field 974 includes all of these fields, the full opcode field 974 includes less than all of these fields in embodiments that do not support all of them. The full opcode field 974 provides the operation code (opcode).

The augmentation operation field 950, the data element width field 964, and the write mask field 970 allow these features to be specified on a per instruction basis in the generic vector-friendly instruction format.

The combination of write mask field and data element width field create typed instructions in that they allow the mask to be applied based on different data element widths.

The various instruction templates found within class A and class B are beneficial in different situations. In some embodiments of the specification, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the specification). Also, a single processor may include multiple cores, all of which support the same class or in which different cores support different classes. For instance, in a processor with separate graphics and general purpose cores, one of the graphics cores intended primarily for graphics and/or scientific computing may support only class A, while one or more of the general purpose cores may be high performance general purpose cores with out-of-order execution and register renaming intended for general-purpose computing that supports only class B. Another processor that does not have a separate graphics core may include one more general purpose in-order or out-of-order cores that support both class A and class B. Of course, features from one class may also be implemented in the other class in different embodiments of the specification. Programs written in a high level language would be put (e.g., just in time compiled or statically compiled) into an variety of different executable forms, including: 1) a form having only instructions of the class or classes supported by the target processor for execution; or 2) a form having alternative routines written using different combinations of the instructions of all classes and having control flow code that selects the routines to execute based on the instructions supported by the processor which is currently executing the code.

Example Specific Vector-Friendly Instruction Format

FIGS. 10a-10d are block diagrams illustrating an example specific vector-friendly instruction format according to one or more examples of the present specification.

Figure 10A:
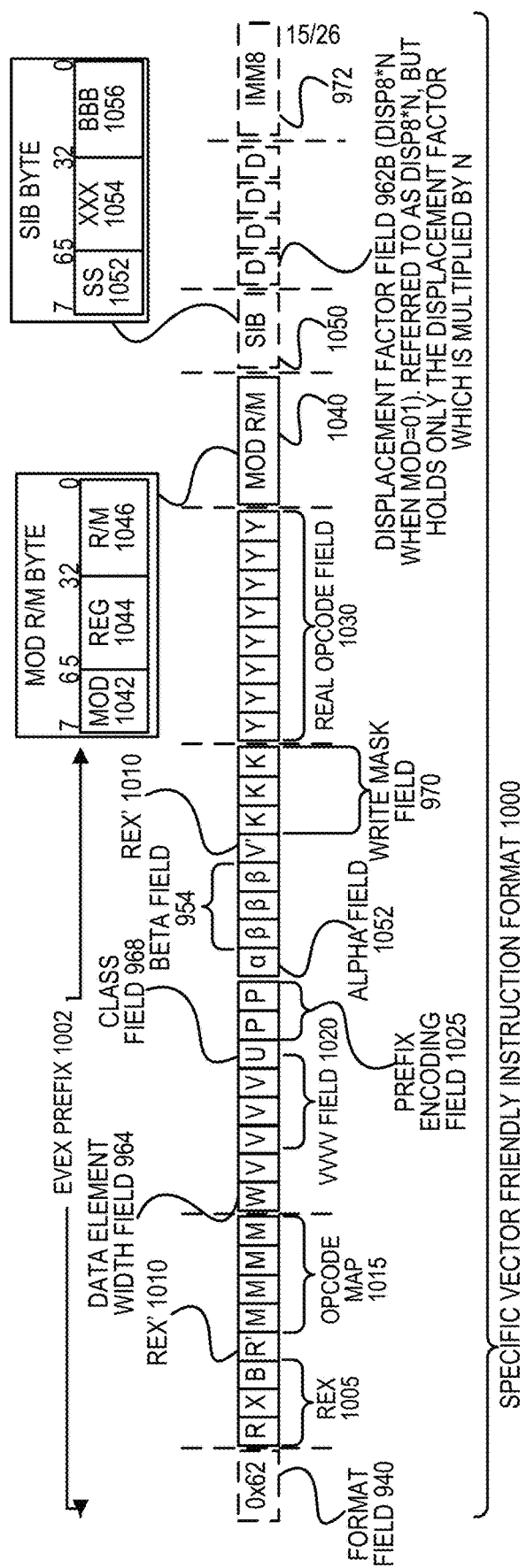
FIGS. 10a-10d are block diagrams illustrating an example specific vector-friendly instruction format, according to one or more examples of the present specification.

FIG. 10a shows a specific vector-friendly instruction format 1000 that is specific in the sense that it specifies the location, size, interpretation, and order of the fields, as well as values for some of those fields. The specific vector-friendly instruction format 1000 may be used to extend the x86 instruction set, and thus some of the fields are similar or the same as those used in the existing x86 instruction set and extension thereof (e.g., AVX). This format remains consistent with the prefix encoding field, real opcode byte field, MOD RIM field, SIB field, displacement field, and immediate fields of the existing x86 instruction set with extensions. The fields from FIGS. 9a and 9b into which the fields from FIG. 10a map are illustrated.

It should be understood that, although embodiments of the specification are described with reference to the specific vector-friendly instruction format 1000 in the context of the generic vector-friendly instruction format 900 for illustrative purposes, the present specification is not limited to the specific vector-friendly instruction format 1000 except where claimed. For example, the generic vector-friendly instruction format 900 contemplates a variety of possible sizes for the various fields, while the specific vector-friendly instruction format 1000 is shown as having fields of specific sizes. By way of particular example, while the data element width field 964 is illustrated as a one bit field in the specific vector-friendly instruction format 1000, the present specification is not so limited (that is, the generic vector-friendly instruction format 900 contemplates other sizes of the data element width field 964).

The generic vector-friendly instruction format 900 includes the following fields listed below in the order illustrated in FIG. 10a.

EVEX Prefix (Bytes 0-3) 1002—is encoded in a four-byte form.

Format Field 940 (EVEX Byte 0, bits [7:0])—the first byte (EVEX Byte 0) is the format field 940 and it contains 0x62 (the unique value used for distinguishing the vector-friendly instruction format in one embodiment).

The second through fourth bytes (EVEX Bytes 1-3) include a number of bit fields providing specific capability.

REX field 1005 (EVEX Byte 1, bits [7-5])—consists of an EVEX.R bit field (EVEX Byte 1, bit [7]-R), EVEX.X bit field (EVEX byte 1, bit [6]-X), and 957BEX byte 1, bit[5]-B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 910—this is the first part of the REX' field 910 and is the EVEX.R' bit field (EVEX Byte 1, bit [4]-R') that is used to encode either the upper 16 or lower 16 of the extended 32 register set. In one embodiment, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; other embodiments do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1015 (EVEX byte 1, bits [3:0]-mmmm)—its content encodes an implied leading opcode byte (0F, 0F 38, or 0F 3).

Data element width field 964 (EVEX byte 2, bit [7]-W)—is represented by the notation EVEX.W. EVEX.W is used to define the granularity (size) of the datatype (either 32-bit data elements or 64-bit data elements).

EVEX.vvvv 1020 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1020 encodes the 4 low-order bits of the first source register specifier stored in inverted (1s complement) form. Depending on the instruction, an extra different EVEX bit field is used to extend the specifier size to 32 registers.

EVEX.U 968 Class field (EVEX byte 2, bit [2]-U)—if EVEX.0=0, it indicates class A or EVEX.U0; if EVEX.0=1, it indicates class B or EVEX.U1.

Prefix encoding field 1025 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use an SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 952 (EVEX byte 3, bit [7]-EH; also known as EVEX.eh, EVEX.rs, EVEX.rl, EVEX.write mask control, and EVEX.n; also illustrated with α)—as previously described, this field is context specific.

Beta field 954 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 910—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 970 (EVEX byte 3, bits [2:0]-kkk)—its content specifies the index of a register in the write mask registers as previously described. In one embodiment, the specific value EVEX.kkk=000 has a special behavior implying no write mask is used for the particular instruction (this may be implemented in a variety of ways including the use of a write mask hardwired to all ones or hardware that bypasses the masking hardware).

Real opcode field 1030 (Byte 4) is also known as the opcode byte. Part of the opcode is specified in this field.

MOD R/M Field 1040 (Byte 5) includes MOD field 1042, Reg field 1044, and R/M field 1046. As previously described, the MOD field's 1042 content distinguishes between memory access and non-memory access operations. The role of Reg field 1044 can be summarized to two situations: encoding either the destination register operand or a source register operand, or be treated as an opcode extension and not used to encode any instruction operand. The role of R/M field 1046 may include the following: encoding the instruction operand that references a memory address, or encoding either the destination register operand or a source register operand.

Scale, Index, Base (SIB) Byte (Byte 6)—as previously described, the scale field's 950 content is used for memory address generation. SIB.xxx 1054 and SIB.bbb 1056—the contents of these fields have been previously referred to with regard to the register indexes Xxxx and Bbbb.

Displacement field 962A (Bytes 7-10)—when MOD field 1042 contains 10, bytes 7-10 are the displacement field 962A, and it works the same as the legacy 32-bit displacement (disp32) and works at byte granularity.

Displacement factor field 962B (Byte 7)—when MOD field 1042 contains 01, byte 7 is the displacement factor field 962B. The location of this field is the same as that of the legacy x86 instruction set 8-bit displacement (disp8), which works at byte granularity. Since disp8 is sign extended, it can only address between 128 and 127-byte offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 962B is a reinterpretation of disp8; when using displacement factor field 962B, the actual displacement is determined by the content of the displacement factor field multiplied by the size of the memory operand access (N). This type of displacement is referred to as disp8*N. This reduces the average instruction length (a single byte used for the displacement but with a much greater range). Such compressed displacement is based on the assumption that the effective displacement is a multiple of the granularity of the memory access, and hence, the redundant low-order bits of the address offset do not need to be encoded. In other words, the displacement factor field 962B substitutes the legacy x86 instruction set 8-bit displacement. Thus, the displacement factor field 962B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 972 operates as previously described.

Full Opcode Field

Figure 10B:
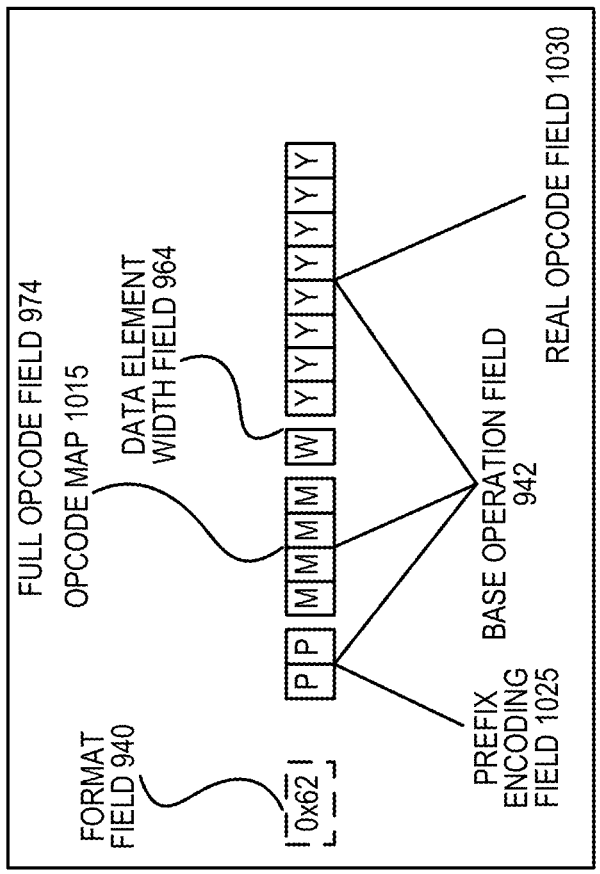

FIG. 10b is a block diagram illustrating the fields of the specific vector-friendly instruction format 1000 that make up the full opcode field 974 according to one embodiment. Specifically, the full opcode field 974 includes the format field 940, the base operation field 942, and the data element width (W) field 964. The base operation field 942 includes the prefix encoding field 1025, the opcode map field 1015, and the real opcode field 1030.

Register Index Field

Figure 10C:
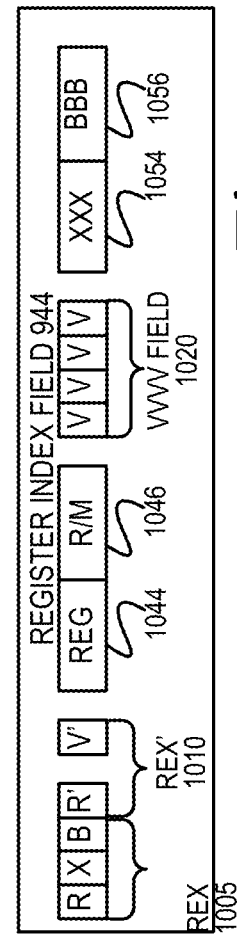

FIG. 10c is a block diagram illustrating the fields of the specific vector-friendly instruction format 1000 that make up the register index field 944 according to one embodiment. Specifically, the register index field 944 includes the REX field 1005, the REX' field 1010, the MODR/M.reg field 1044, the MODR/M.r/m field 1046, the VVVV field 1020, xxx field 1054, and the bbb field 1056.

Augmentation Operation Field

Figure 10D:
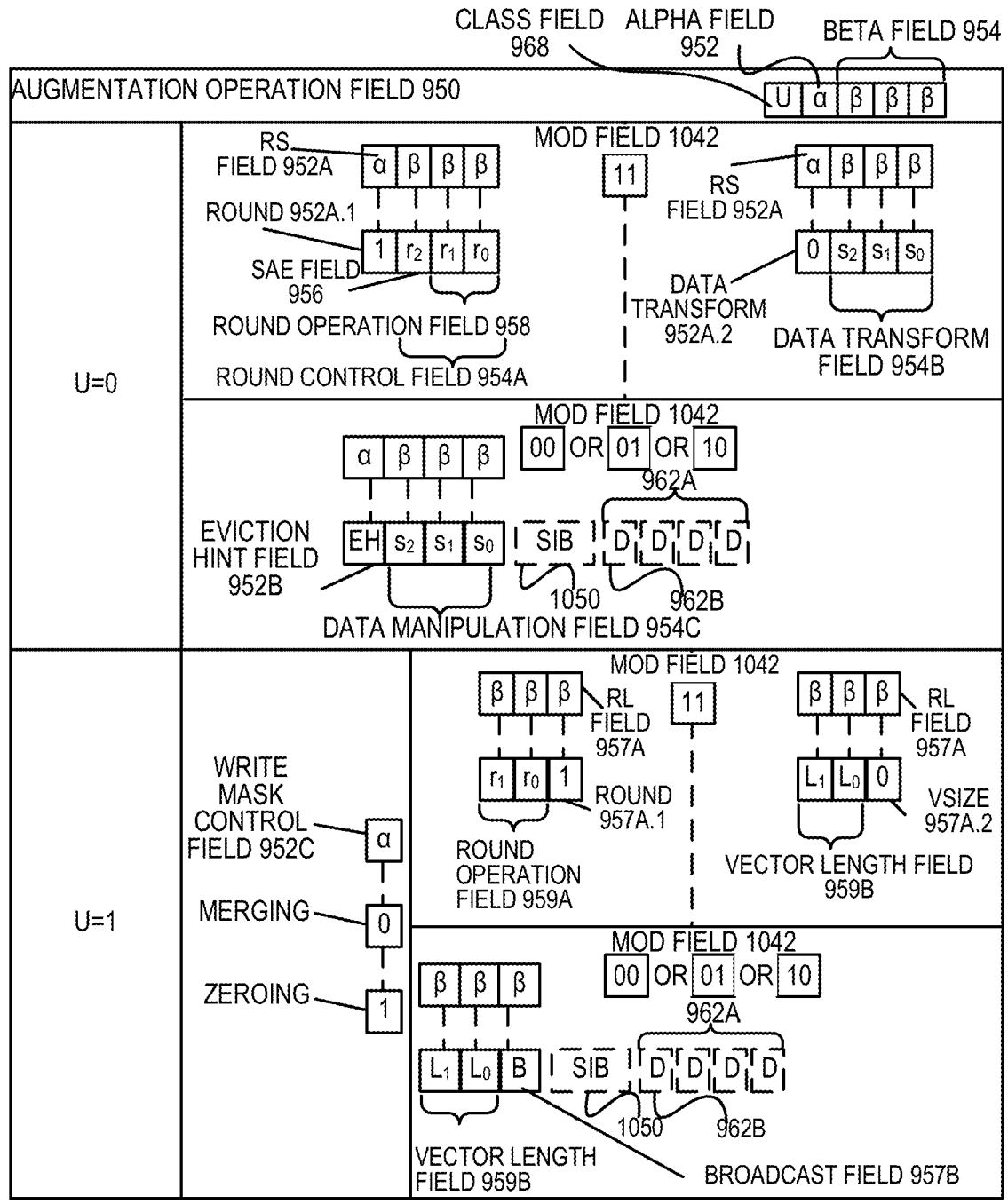

FIG. 10d is a block diagram illustrating the fields of the specific vector-friendly instruction format 1000 that make up the augmentation operation field 950 according to one embodiment. When the class (U) field 968 contains 0, it signifies EVEX.U0 (class A 968A); when it contains 1, it signifies EVEX.U1 (class B 968B). When U=0 and the MOD field 1042 contains 11 (signifying a no memory access operation), the alpha field 952 (EVEX byte 3, bit [7]-EH) is interpreted as the rs field 952A. When the rs field 952A contains a 1 (round 952A.1), the beta field 954 (EVEX byte 3, bits [6:4]-SSS) is interpreted as the round control field 954A. The round control field 954A includes a one bit SAE field 956 and a two bit round operation field 958. When the rs field 952A contains a 0 (data transform 952A.2), the beta field 954 (EVEX byte 3, bits [6:4]-SSS) is interpreted as a three bit data transform field 954B. When U=0 and the MOD field 1042 contains 00, 01, or 10 (signifying a memory access operation), the alpha field 952 (EVEX byte 3, bit [7]-EH) is interpreted as the eviction hint (EH) field 952B and the beta field 954 (EVEX byte 3, bits [6:4]-SSS) is interpreted as a three bit data manipulation field 954C.

When U=1, the alpha field 952 (EVEX byte 3, bit [7]-EH) is interpreted as the write mask control (Z) field 952C. When U=1 and the MOD field 1042 contains 11 (signifying a no memory access operation), part of the beta field 954 (EVEX byte 3, bit [4]-$S_0$) is interpreted as the RL field 957A; when it contains a 1 (round 957A.1) the rest of the beta field 954 (EVEX byte 3, bit [6-5]-$S_{2-1}$) is interpreted as the round operation field 959A, while when the RL field 957A contains a 0 (VSIZE 957.A2) the rest of the beta field 954 (EVEX byte 3, bit [6-5]-$S_{2-1}$) is interpreted as the vector length field 959B (EVEX byte 3, bit [6-5]-$L_{1-0}$). When U=1 and the MOD field 1042 contains 00, 01, or 10 (signifying a memory access operation), the beta field 954 (EVEX byte 3, bits [6:4]-SSS) is interpreted as the vector length field 959B (EVEX byte 3, bit [6-5]-$L_{1-0}$) and the broadcast field 957B (EVEX byte 3, bit [4]-B).

Example Register Architecture

Figure 11:
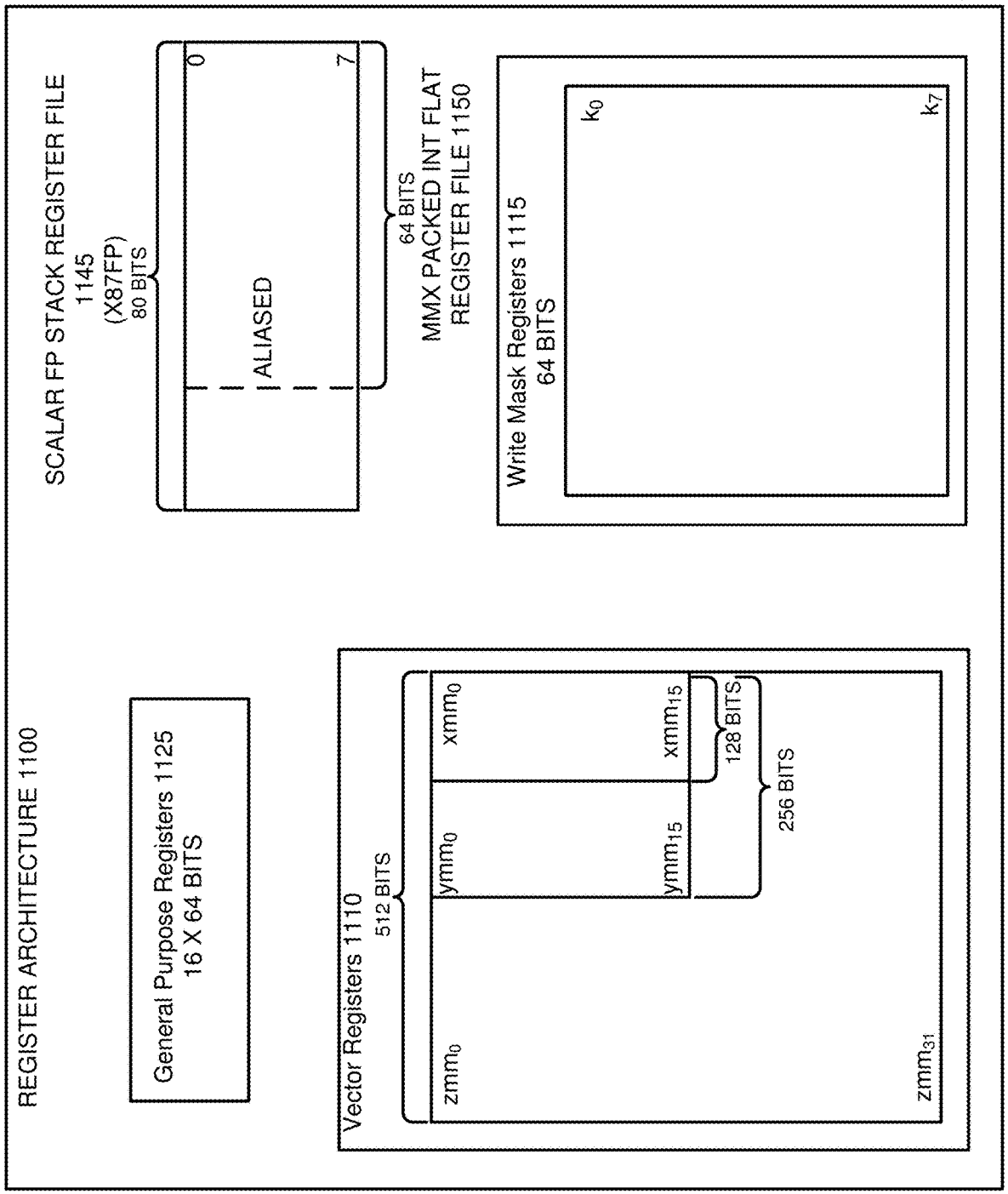
FIG. 11 is a block diagram of a register architecture, according to one or more examples of the present specification.

FIG. 11 is a block diagram of a register architecture 1100 according to one embodiment. In the embodiment illustrated, there are 32 vector registers 1110 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector-friendly instruction format 1000 operates on these overlaid register files as illustrated in the below tables.

| Adjustable Vector Length | Class | Operations | Registers |
|---|---|---|---|
| Instruction Templates that do not include the vector length field 959B | A (FIG. 9a; U = 0) | 910, 915, 925, 930 | zmm registers (the vector length is 64 byte) |
| | B (FIG. 9b; U = 1) | 912 | zmm registers (the vector length is 64 byte) |
| Instruction templates that do include the vector length field 959B | B (FIG. 9b; U = 1) | 917, 927 | zmm, ymm, or xmm registers (the vector length is 64 byte, 32 byte, or 16 byte) depending on the vector length field 959B |

In other words, the vector length field 959B selects between a maximum length and one or more other shorter lengths, where each such shorter length is half the length of the preceding length; and instruction templates without the vector length field 959B operate on the maximum vector length. Further, in one embodiment, the class B instruction templates of the specific vector-friendly instruction format 1000 operate on packed or scalar single/double-precision floating point data and packed or scalar integer data. Scalar operations are operations performed on the lowest order data element position in a zmm/ymm/xmm register; the higher order data element positions are either left the same as they were prior to the instruction or zeroed depending on the embodiment.

Write mask registers 1115—in the embodiment illustrated, there are 8 write mask registers (k0 through k7), each 64 bits in size. In an alternate embodiment, the write mask registers 1115 are 16 bits in size. As previously described, in one embodiment, the vector mask register k0 cannot be used as a write mask; when the encoding that would normally indicate k0 is used for a write mask, it selects a hardwired write mask of 0xFFFF, effectively disabling write masking for that instruction.

General-purpose registers 1125—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1145, on which is aliased the MMX packed integer flat register file 1150—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Other embodiments may use wider or narrower registers. Additionally, other embodiments may use more, less, or different register files and registers.

Example Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific throughput. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Example core architectures are described next, followed by descriptions of example processors and computer architectures.

Example Core Architectures

In-Order and Out-of-Order Core Block Diagram

FIG. 12a is a block diagram illustrating both an example in-order pipeline and an example register renaming, out-of-order issue/execution pipeline. FIG. 12b is a block diagram illustrating both an embodiment of an in-order architecture core and an example register renaming, out-of-order issue/execution architecture core to be included in a processor. The solid lined boxes in FIGS. 12a-12b illustrate the in-order pipeline and in-order core, while the optional addition of the dashed, lined boxes illustrates the register renaming, out-of-order issue/execution pipeline and core. Given that the in-order aspect is a subset of the out-of-order aspect, the out-of-order aspect will be described.

In FIG. 12a, a processor pipeline 1200 includes a fetch stage 1202, a length decode stage 1204, a decode stage 1206, an allocation stage 1208, a renaming stage 1210, a scheduling (also known as a dispatch or issue) stage 1212, a register read/memory read stage 1214, an execute stage 1216, a write back/memory write stage 1218, an exception handling stage 1222, and a commit stage 1224.

FIG. 12b shows processor core 1290 including a front end unit 1230 coupled to an execution engine unit 1250, and both are coupled to a memory unit 1270. The core 1290 may be a reduced instruction set computing (RISC) core, a complex instruction set computing (CISC) core, a very long instruction word (VLIW) core, or a hybrid or alternative core type. As yet another option, the core 1290 may be a special-purpose core, such as, for example, a network or communication core, compression engine, coprocessor core, general purpose computing graphics processing unit (GPGPU) core, graphics core, or the like.

The front end unit 1230 includes a branch prediction unit 1232 coupled to an instruction cache unit 1234, which is coupled to an instruction translation lookaside buffer (TLB) 1236, which is coupled to an instruction fetch unit 1238, which is coupled to a decode unit 1240. The decode unit 1240 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1240 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1290 includes a microcode ROM or other medium that stores microcode for certain macroinstructions (e.g., in decode unit 1240 or otherwise within the front end unit 1230). The decode unit 1240 is coupled to a rename/allocator unit 1252 in the execution engine unit 1250.

The execution engine unit 1250 includes the rename/allocator unit 1252 coupled to a retirement unit 1254 and a set of one or more scheduler unit(s) 1256. The scheduler unit(s) 1256 represents any number of different schedulers, including reservation stations, central instruction window, etc. The scheduler unit(s) 1256 is coupled to the physical register file(s) unit(s) 1258. Each of the physical register file(s) units 1258 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1258 comprises a vector registers unit, a write mask registers unit, and a scalar registers unit. These register units may provide architectural vector registers, vector mask registers, and general purpose registers. The physical register file(s) unit(s) 1258 is overlapped by the retirement unit 1254 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 1254 and the physical register file(s) unit(s) 1258 are coupled to the execution cluster(s) 1260. The execution cluster(s) 1260 includes a set of one or more execution units 1262 and a set of one or more memory access units 1264. The execution units 1262 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1256, physical register file(s) unit(s) 1258, and execution cluster(s) 1260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1264). It should also be understood that where separate pipelines are used, one or more of these pipelines may be out-of-order issue/execution and the rest in-order.

The set of memory access units 1264 is coupled to the memory unit 1270, which includes a data TLB unit 1272 coupled to a data cache unit 1274 coupled to a level 2 (L2) cache unit 1276. In one embodiment, the memory access units 1264 may include a load unit, a store address unit, and a store data unit, each of which is coupled to the data TLB unit 1272 in the memory unit 1270. The instruction cache unit 1234 is further coupled to a level 2 (L2) cache unit 1276 in the memory unit 1270. The L2 cache unit 1276 is coupled to one or more other levels of cache and eventually to a main memory.

By way of example, the register renaming, out-of-order issue/execution core architecture may implement the pipeline 1200 as follows: 1) the instruction fetch 1238 performs the fetch and length decoding stages 1202 and 1204; 2) the decode unit 1240 performs the decode stage 1206; 3) the rename/allocator unit 1252 performs the allocation stage 1208 and renaming stage 1210; 4) the scheduler unit(s) 1256 performs the schedule stage 1212; 5) the physical register file(s) unit(s) 1258 and the memory unit 1270 perform the register read/memory read stage 1214; the execution cluster 1260 performs the execute stage 1216; 6) the memory unit 1270 and the physical register file(s) unit(s) 1258 perform the write back/memory write stage 1218; 7) various units may be involved in the exception handling stage 1222; and 8) the retirement unit 1254 and the physical register file(s) unit(s) 1258 perform the commit stage 1224.

The core 1290 may support one or more instruction sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1290 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1234/1274 and a shared L2 cache unit 1276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Example In-Order Core Architecture

FIGS. 13*a*-13*b* illustrate a block diagram of a more specific example in-order core architecture, which core would be one of several logic blocks (including other cores of the same type and/or different types) in a chip. The logic blocks communicate through a high-bandwidth interconnect network (e.g., a ring network) with some fixed function logic, memory IO interfaces, and other necessary IO logic, depending on the application.

FIG. 13*a* is a block diagram of a single processor core, along with its connection to the on-die interconnect network 1302 and with its local subset of the Level 2 (L2) cache 1304, according to one or more embodiments. In one embodiment, an instruction decoder 1300 supports the x86 instruction set with a packed data instruction set extension. An L1 cache 1306 allows low-latency accesses to cache memory into the scalar and vector units. While in one embodiment (to simplify the design), a scalar unit 1308 and a vector unit 1310 use separate register sets (respectively, scalar registers 1312 and vector registers 1314) and data transferred between them is written to memory and then read back in from a level 1 (L1) cache 1306, other embodiments may use a different approach (e.g., use a single register set or include a communication path that allows data to be transferred between the two register files without being written and read back).

The local subset of the L2 cache 1304 is part of a global L2 cache that is divided into separate local subsets, one per processor core. Each processor core has a direct access path to its own local subset of the L2 cache 1304. Data read by a processor core is stored in its L2 cache subset 1304 and can be accessed quickly, in parallel with other processor cores accessing their own local L2 cache subsets. Data written by a processor core is stored in its own L2 cache subset 1304 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 13*b* is an expanded view of part of the processor core in FIG. 13*a* according to embodiments of the specification. FIG. 13*b* includes an L1 data cache 1306A, part of the L1 cache 1304, as well as more detail regarding the vector unit 1310 and the vector registers 1314. Specifically, the vector unit 1310 is a 16-wide vector processing unit (VPU) (see the 16-wide ALU 1328), which executes one or more of integer, single-precision float, and double-precision float instructions. The VPU supports swizzling the register inputs with swizzle unit 1320, numeric conversion with numeric convert units 1322A-B, and replication with replication unit 1324 on the memory input. Write mask registers 1326 allow predicating resulting vector writes.

Figure 14:
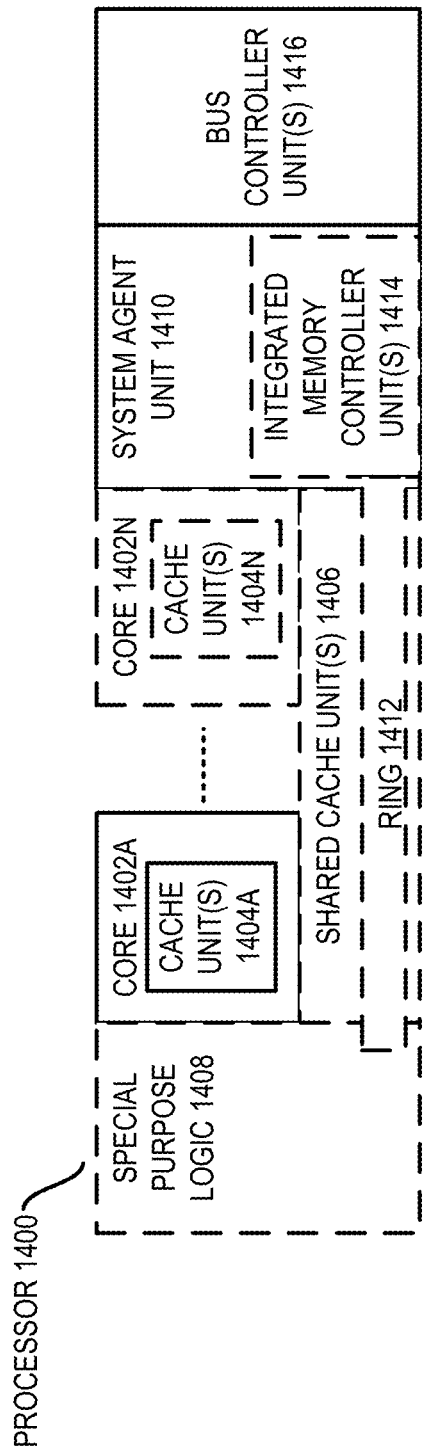
FIG. 14 is a block diagram of a processor that may have more than one core, may have an integrated memory controller, and may have integrated graphics, according to one or more examples of the present specification.

FIG. 14 is a block diagram of a processor 1400 that may have more than one core, may have an integrated memory controller, and may have integrated graphics according to embodiments of the specification. The solid lined boxes in FIG. 14 illustrate a processor 1400 with a single core 1402A, a system agent 1410, a set of one or more bus controller units 1416, while the optional addition of the dashed lined boxes illustrates an alternative processor 1400 with multiple cores 1402A-N, a set of one or more integrated memory controller unit(s) 1414 in the system agent unit 1410, and special purpose logic 1408.

Thus, different implementations of the processor 1400 may include: 1) a CPU with the special purpose logic 1408 being integrated graphics and/or scientific (throughput) logic (which may include one or more cores), and the cores 1402A-N being one or more general purpose cores (e.g., general purpose in-order cores, general purpose out-of-order cores, a combination of the two); 2) a coprocessor with the cores 1402A-N being a large number of special purpose cores intended primarily for graphics and/or scientific throughput; and 3) a coprocessor with the cores 1402A-N being a large number of general purpose in-order cores. Thus, the processor 1400 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1400 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1406, and external memory (not shown) coupled to the set of integrated memory controller units 1414. The set of shared cache units 1406 may include one or more mid-level caches, such as level 2 (L2), level 3 (L3), level 4 (L4), or other levels of cache, a last level cache (LLC), and/or combinations thereof. While in one embodiment a ring based interconnect unit 1412 interconnects the integrated graphics logic 1408, the set of shared cache units 1406, and the system agent unit 1410/integrated memory controller unit(s) 1414, alternative embodiments may use any number of well-known techniques for interconnecting such units. In one embodiment, coherency is maintained between one or more cache units 1406 and cores 1402A-N.

In some embodiments, one or more of the cores 1402A-N are capable of multi-threading. The system agent 1410 includes those components coordinating and operating cores 1402A-N. The system agent unit 1410 may include, for example, a power control unit (PCU) and a display unit. The PCU may be or include logic and components needed for regulating the power state of the cores 1402A-N and the integrated graphics logic 1408. The display unit is for driving one or more externally connected displays.

The cores 1402A-N may be homogenous or heterogeneous in terms of architecture instruction set; that is, two or more of the cores 1402A-N may be capable of executing the same instruction set, while others may be capable of executing only a subset of that instruction set or a different instruction set.

Example Computer Architectures

FIGS. 15-18 are block diagrams of example computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 15:
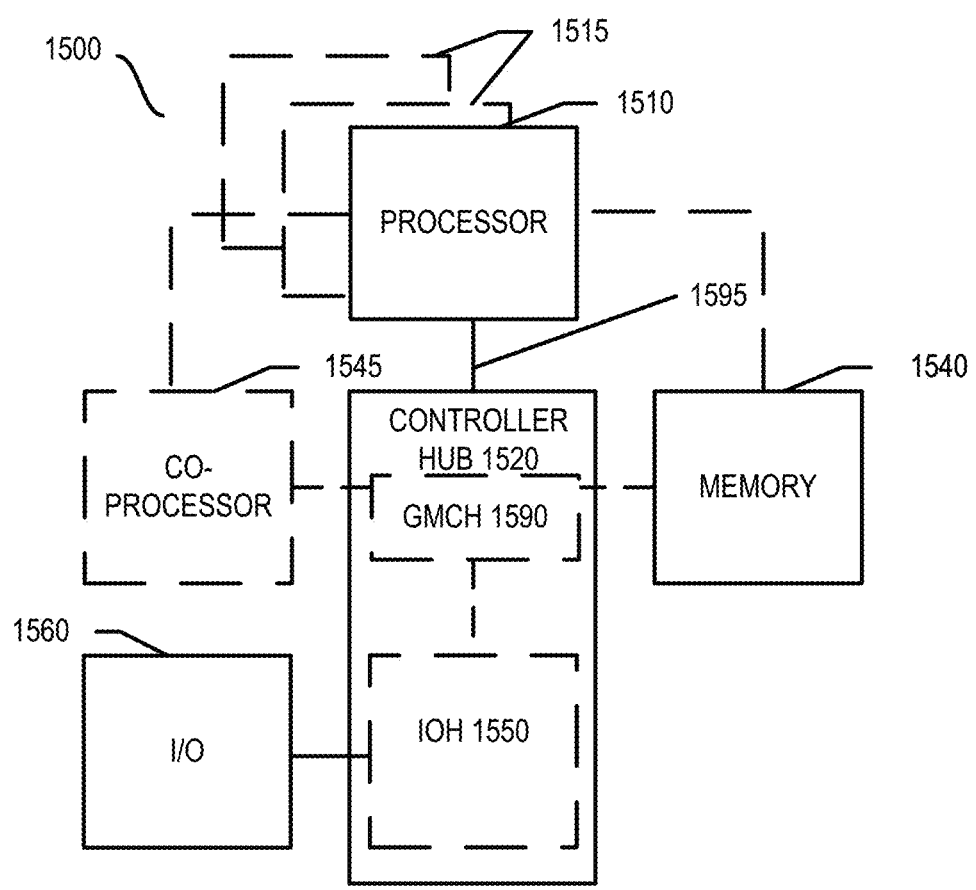
FIGS. 15-18 are block diagrams of computer architectures, according to one or more examples of the present specification.

Referring now to FIG. 15, shown is a block diagram of a system 1500 in accordance with one embodiment. The system 1500 may include one or more processors 1510, 1515, which are coupled to a controller hub 1520. In one embodiment the controller hub 1520 includes a graphics memory controller hub (GMCH) 1590 and an Input/Output Hub (IOH) 1550 (which may be on separate chips); the GMCH 1590 includes memory and graphics controllers to which are coupled memory 1540 and a coprocessor 1545; the IOH 1550 couples input/output (IO) devices 1560 to the GMCH 1590. Alternatively, one or both of the memory and graphics controllers are integrated within the processor (as described herein), the memory 1540 and the coprocessor 1545 are coupled directly to the processor 1510, and the controller hub 1520 in a single chip with the IOH 1550.

The optional nature of additional processors 1515 is denoted in FIG. 15 with broken lines. Each processor 1510, 1515 may include one or more of the processing cores described herein and may be some version of the processor 1400.

The memory 1540 may be, for example, dynamic random access memory (DRAM), phase change memory (PCM), or a combination of the two. For at least one embodiment, the controller hub 1520 communicates with the processor(s) 1510, 1515 via a multidrop bus, such as a frontside bus (FSB), point-to-point interface such as Ultra Path Interconnect (UPI), or similar connection 1595.

In one embodiment, the coprocessor 1545 is a special-purpose processor, such as, for example, a high-throughput MIC processor, a network or communication processor, compression engine, graphics processor, GPGPU, embedded processor, or the like. In one embodiment, controller hub 1520 may include an integrated graphics accelerator.

There can be a variety of differences between the physical resources 1510, 1515 in terms of a spectrum of metrics of merit including architectural, microarchitectural, thermal, power consumption characteristics, and the like.

In one embodiment, the processor 1510 executes instructions that control data processing operations of a general type. Embedded within the instructions may be coprocessor instructions. The processor 1510 recognizes these coprocessor instructions as being of a type that should be executed by the attached coprocessor 1545. Accordingly, the processor 1510 issues these coprocessor instructions (or control signals representing coprocessor instructions) on a coprocessor bus or other interconnect, to coprocessor 1545. Co-processor(s) 1545 accepts and executes the received coprocessor instructions.

Figure 16:
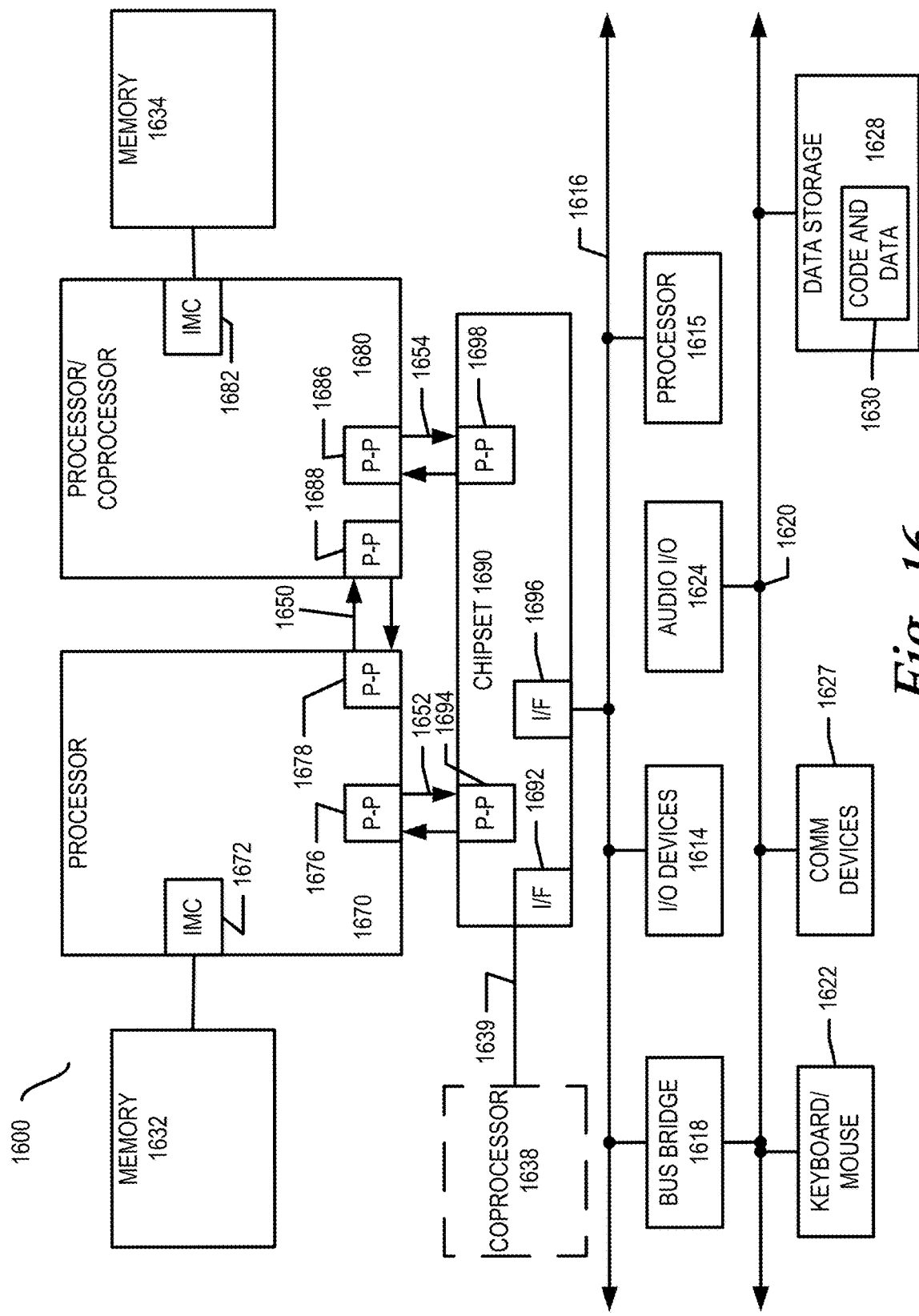

Referring now to FIG. 16, shown is a block diagram of a first more specific example system 1600. As shown in FIG. 16, multiprocessor system 1600 is a point-to-point interconnect system, and includes a first processor 1670 and a second processor 1680 coupled via a point-to-point interconnect 1650. Each of processors 1670 and 1680 may be some version of the processor 1400. In one embodiment, processors 1670 and 1680 are respectively processors 1510 and 1515, while coprocessor 1638 is coprocessor 1545. In another embodiment, processors 1670 and 1680 are respectively processor 1510 coprocessor 1545.

Processors 1670 and 1680 are shown including integrated memory controller (IMC) units 1672 and 1682, respectively. Processor 1670 also includes as part of its bus controller units point-to-point (P-P) interfaces 1676 and 1678; similarly, second processor 1680 includes P-P interfaces 1686 and 1688. Processors 1670, 1680 may exchange information via a point-to-point (P-P) interface 1650 using P-P interface circuits 1678, 1688. As shown in FIG. 16, IMCs 1672 and 1682 couple the processors to respective memories, namely a memory 1632 and a memory 1634, which may be portions of main memory locally attached to the respective processors.

Processors 1670, 1680 may each exchange information with a chipset 1690 via individual P-P interfaces 1652, 1654 using point to point interface circuits 1676, 1694, 1686, 1698. Chipset 1690 may optionally exchange information with the coprocessor 1638 via a high-performance interface 1639. In one embodiment, the coprocessor 1638 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1690 may be coupled to a first bus 1616 via an interface 1696. In one embodiment, first bus 1616 may be a peripheral component interconnect (PCI) bus, or a bus such as a PCI Express bus or another third generation IO interconnect bus, by way of nonlimiting example.

As shown in FIG. 16, various IO devices 1614 may be coupled to first bus 1616, along with a bus bridge 1618 which couples first bus 1616 to a second bus 1620. In one embodiment, one or more additional processor(s) 1615, such as coprocessors, high-throughput MIC processors, GPGPUs, accelerators (such as, e.g., graphics accelerators or digital signal processing (DSP) units), field programmable gate arrays, or any other processor, are coupled to first bus 1616. In one embodiment, second bus 1620 may be a low pin count (LPC) bus. Various devices may be coupled to a second bus 1620 including, for example, a keyboard and/or mouse 1622, communication devices 1627 and a storage unit 1628 such as a disk drive or other mass storage device which may include instructions or code and data 1630, in one embodiment. Further, an audio IO 1624 may be coupled to the second bus 1620. Note that other architectures are possible. For example, instead of the point-to-point architecture of FIG. 16, a system may implement a multidrop bus or other such architecture.

Figure 17:
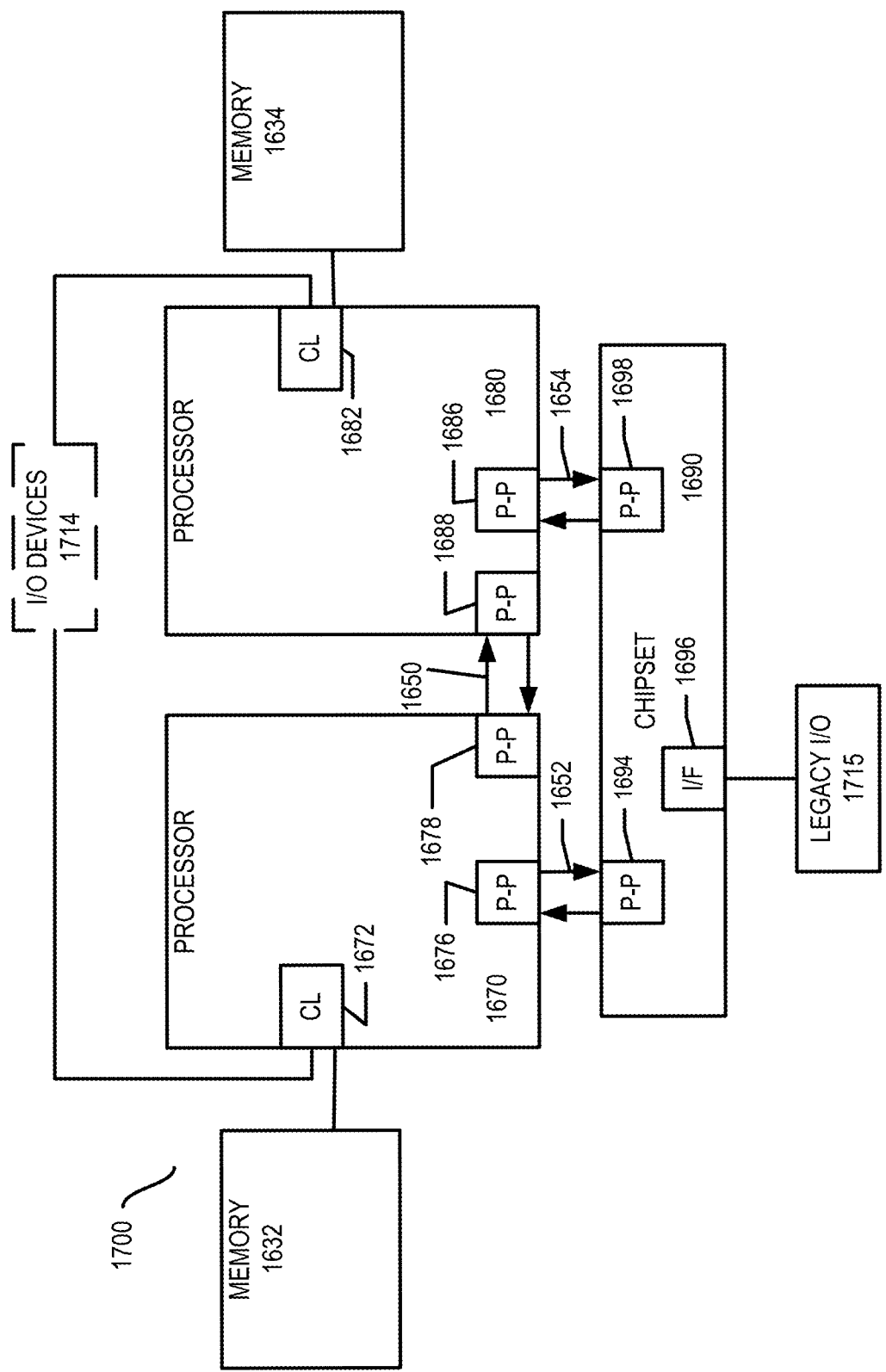

Referring now to FIG. 17, shown is a block diagram of a second more specific example system 1700. FIGS. 16 and 17 bear like reference numerals, and certain aspects of FIG. 16 have been omitted from FIG. 17 in order to avoid obscuring other aspects of FIG. 17.

FIG. 17 illustrates that the processors 1670, 1680 may include integrated memory and IO control logic ("CL") 1672 and 1682, respectively. Thus, the CLs 1672, 1682 include integrated memory controller units and include IO control logic. FIG. 17 illustrates that not only are the memories 1632, 1634 coupled to the CL 1672, 1682, but also that IO devices 1714 are also coupled to the control logic 1672, 1682. Legacy IO devices 1715 are coupled to the chipset 1690.

Figure 18:
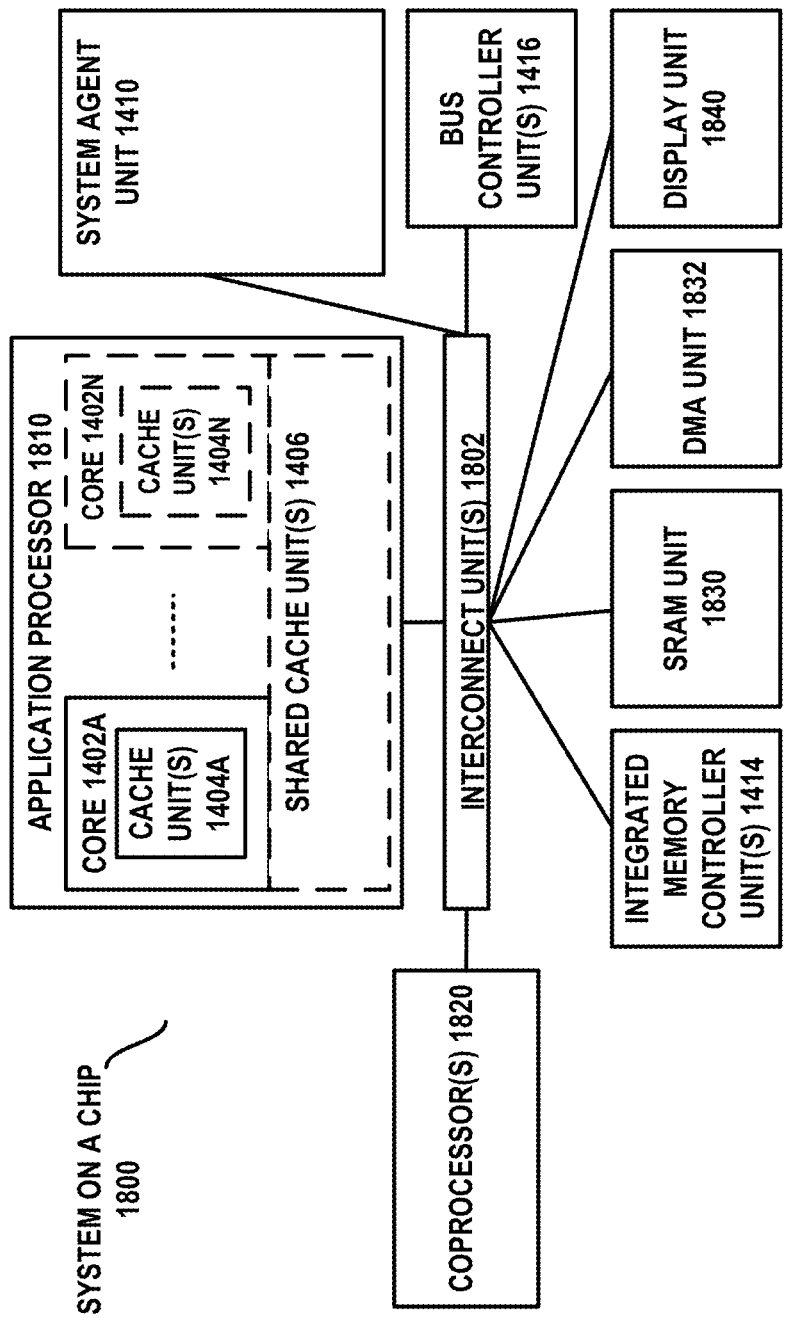

Referring now to FIG. 18, shown is a block diagram of a SoC 1800 in accordance with an embodiment. Similar elements in FIG. 14 bear like reference numerals. Also, dashed lined boxes are optional features on more advanced SoCs. In FIG. 18, an interconnect unit(s) 1802 is coupled to: an application processor 1810 which includes a set of one or more cores 1402A-N and shared cache unit(s) 1406; a system agent unit 1410; a bus controller unit(s) 1416; an integrated memory controller unit(s) 1414; a set of one or more coprocessors 1820 which may include integrated graphics logic, an image processor, an audio processor, and a video processor; a static random access memory (SRAM) unit 1830; a direct memory access (DMA) unit 1832; and a display unit 1840 for coupling to one or more external displays. In one embodiment, the coprocessor(s) 1820 includes a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Some embodiments may be implemented as computer programs or program code executing on programmable systems comprising at least one processor, a storage system (including volatile and nonvolatile memory and/or storage elements), at least one input device, and at least one output device.

Program code, such as code 1630 illustrated in FIG. 16, may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application-specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, nontransitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, some embodiments also include nontransitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation or dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 19:
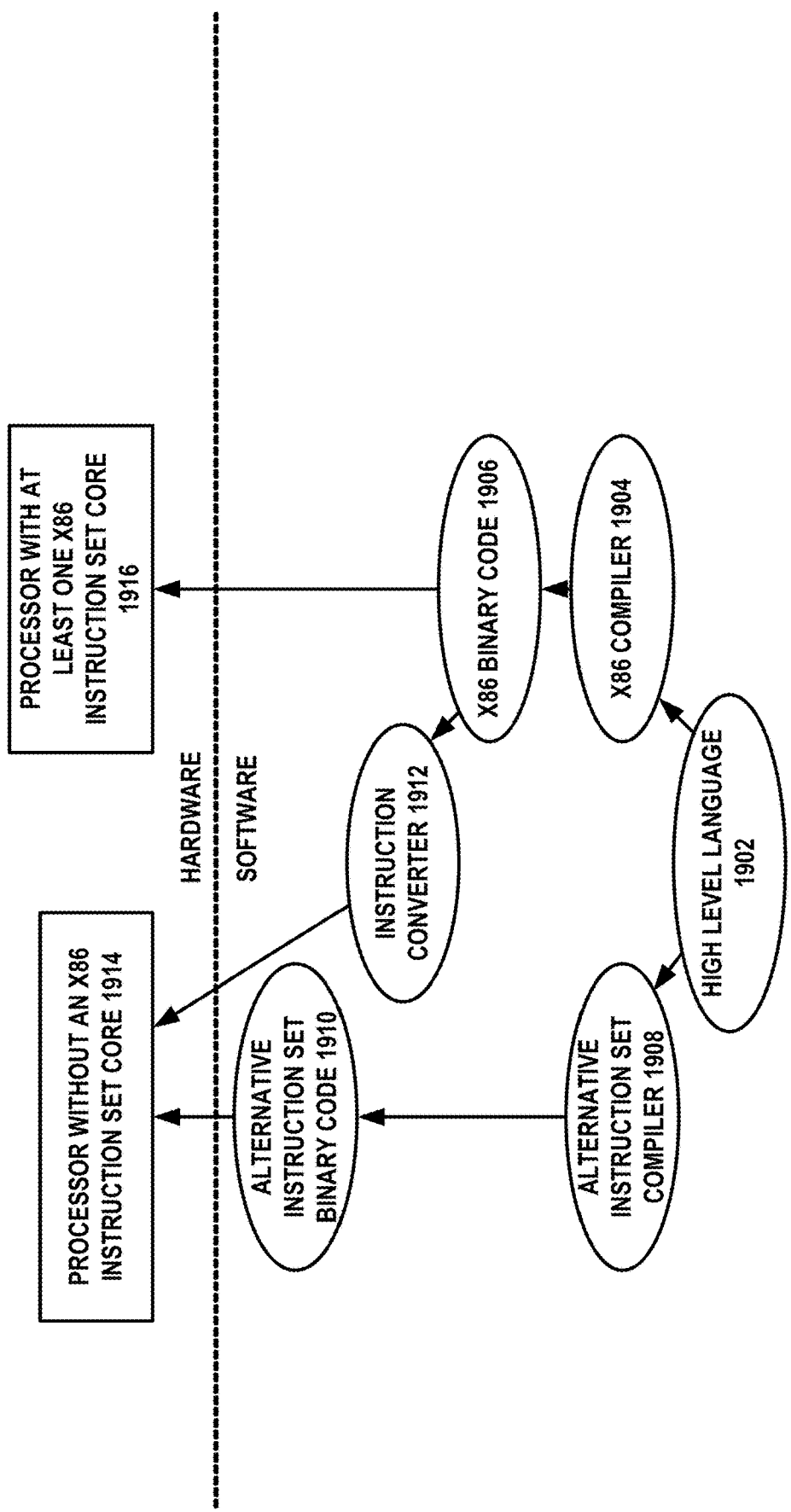
FIG. 19 is a block diagram contrasting the use of a software instruction converter to convert binary instructions in a source instruction set to binary instructions in a target instruction set, according to one or more examples of the present specification.

FIG. 19 is a block diagram contrasting the use of a software instruction converter to convert binary instructions in a source instruction set to binary instructions in a target instruction set. In the illustrated embodiment, the instruction converter is a software instruction converter, although alternatively the instruction converter may be implemented in software, firmware, hardware, or various combinations thereof. FIG. 19 shows a program in a high level language 1902 may be compiled using an x86 compiler 1904 to generate x86 binary code 1906 that may be natively executed by a processor with at least one x86 instruction set core 1916. The processor with at least one x86 instruction set core 1916 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1904 represents a compiler that is operable to generate x86 binary code 1906 (e.g., object code) that can, with or without additional linkage processing, be executed on the processor with at least one x86 instruction set core 1916. Similarly, FIG. 19 shows the program in the high level language 1902 may be compiled using an alternative instruction set compiler 1908 to generate alternative instruction set binary code 1910 that may be natively executed by a processor without at least one x86 instruction set core 1914 (e.g., a processor with cores that execute the MIPS instruction set of MIPS Technologies of Sunnyvale, CA and/or that execute the ARM instruction set of ARM Holdings of Sunnyvale, CA). The instruction converter 1912 is used to convert the x86 binary code 1906 into code that may be natively executed by the processor without an x86 instruction set core 1914. This converted code is not likely to be the same as the alternative instruction set binary code 1910 because an instruction converter capable of this is difficult to make; however, the converted code will accomplish the general operation and be made up of instructions from the alternative instruction set. Thus, the instruction converter 1912 represents software, firmware, hardware, or a combination thereof that, through emulation, simulation or any other process, allows a processor or other electronic device that does not have an x86 instruction set processor or core to execute the x86 binary code 1906.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present specification.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

In the foregoing description, certain aspects of some or all embodiments are described in greater detail than is strictly necessary for practicing the appended claims. These details are provided by way of non-limiting example only, for the purpose of providing context and illustration of the disclosed embodiments. Such details should not be understood to be required, and should not be "read into" the claims as limitations. The phrase may refer to "an embodiment" or "embodiments." These phrases, and any other references to embodiments, should be understood broadly to refer to any combination of one or more embodiments. Furthermore, the several features disclosed in a particular "embodiment" could just as well be spread across multiple embodiments. For example, if features 1 and 2 are disclosed in "an embodiment," embodiment A may have feature 1 but lack feature 2, while embodiment B may have feature 2 but lack feature 1.

This specification may provide illustrations in a block diagram format, wherein certain features are disclosed in separate blocks. These should be understood broadly to disclose how various features interoperate, but are not intended to imply that those features must necessarily be embodied in separate hardware or software. Furthermore, where a single block discloses more than one feature in the same block, those features need not necessarily be embodied in the same hardware and/or software. For example, a computer "memory" could in some circumstances be distributed or mapped between multiple levels of cache or local memory, main memory, battery-backed volatile memory, and various forms of persistent memory such as a hard disk, storage server, optical disk, tape drive, or similar. In certain embodiments, some of the components may be omitted or consolidated. In a general sense, the arrangements depicted in the FIGURES may be more logical in their representations, whereas a physical architecture may include various permutations, combinations, and/or hybrids of these elements. Countless possible design configurations can be used to achieve the operational objectives outlined herein. Accordingly, the associated infrastructure has a myriad of substitute arrangements, design choices, device possibilities, hardware configurations, software implementations, and equipment options.

References may be made herein to a computer-readable medium, which may be a tangible and non-transitory computer-readable medium. As used in this specification and throughout the claims, a "computer-readable medium" should be understood to include one or more computer-readable mediums of the same or different types. A computer-readable medium may include, by way of non-limiting example, an optical drive (e.g., CD/DVD/Blu-Ray), a hard drive, a solid-state drive, a flash memory, or other non-volatile medium. A computer-readable medium could also include a medium such as a read-only memory (ROM), an FPGA or ASIC configured to carry out the desired instructions, stored instructions for programming an FPGA or ASIC to carry out the desired instructions, an intellectual property (IP) block that can be integrated in hardware into other circuits, or instructions encoded directly into hardware or microcode on a processor such as a microprocessor, digital signal processor (DSP), microcontroller, or in any other suitable component, device, element, or object where appropriate and based on particular needs. A nontransitory storage medium herein is expressly intended to include any nontransitory special-purpose or programmable hardware configured to provide the disclosed operations, or to cause a processor to perform the disclosed operations.

Various elements may be "communicatively," "electrically," "mechanically," or otherwise "coupled" to one another throughout this specification and the claims. Such coupling may be a direct, point-to-point coupling, or may include intermediary devices. For example, two devices may be communicatively coupled to one another via a controller that facilitates the communication. Devices may be electrically coupled to one another via intermediary devices such as signal boosters, voltage dividers, or buffers. Mechanically-coupled devices may be indirectly mechanically coupled.

Any "module" or "engine" disclosed herein may refer to or include software, a software stack, a combination of hardware, firmware, and/or software, a circuit configured to carry out the function of the engine or module, or any computer-readable medium as disclosed above. Such modules or engines may, in appropriate circumstances, be provided on or in conjunction with a hardware platform, which may include hardware compute resources such as a processor, memory, storage, interconnects, networks and network interfaces, accelerators, or other suitable hardware. Such a hardware platform may be provided as a single monolithic device (e.g., in a PC form factor), or with some or part of the function being distributed (e.g., a "composite node" in a high-end data center, where compute, memory, storage, and other resources may be dynamically allocated and need not be local to one another).

There may be disclosed herein flow charts, signal flow diagram, or other illustrations showing operations being performed in a particular order. Unless otherwise expressly noted, or unless required in a particular context, the order should be understood to be a non-limiting example only. Furthermore, in cases where one operation is shown to follow another, other intervening operations may also occur, which may be related or unrelated. Some operations may also be performed simultaneously or in parallel. In cases where an operation is said to be "based on" or "according to" another item or operation, this should be understood to imply that the operation is based at least partly on or according at least partly to the other item or operation. This should not be construed to imply that the operation is based solely or exclusively on, or solely or exclusively according to the item or operation.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

In a general sense, any suitably-configured circuit or processor can execute any type of instructions associated with the data to achieve the operations detailed herein. Any processor disclosed herein could transform an element or an article (for example, data) from one state or thing to another state or thing. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms "memory" and "storage," as appropriate.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

Example Implementations

There is disclosed in one example a convolutional neural network (CNN) accelerator, comprising: a CNN circuit for performing a multiple-layer CNN computation, wherein the multiple layers are to receive an input feature according to an input feature map (IFM) and a weight matrix per output feature, wherein an output of a first layer provides an input for a next layer; and a mapping circuit to access a three-dimensional input matrix stored as a Z-major matrix; wherein the CNN circuit is to perform an inner-product direct convolution on the Z-major matrix, wherein the direct convolution lacks a lowering operation.

There is further disclosed a CNN accelerator, wherein the inner-product convolution is a vector-by-vector operation.

There is further disclosed a CNN accelerator, wherein the mapping circuit is to access the three-dimensional input as an X-major matrix and to rotate the matrix on three axes to generate the Z-major matrix.

There is further disclosed a CNN accelerator, wherein the CNN circuit is a low-precision CNN.

There is further disclosed a CNN accelerator, wherein the low-precision CNN is a 4-bit CNN.

There is further disclosed a CNN accelerator, wherein the low-precision CNN is a ternary CNN.

There is further disclosed a CNN accelerator, wherein the low-precision CNN is a binary CNN.

There is further disclosed a CNN accelerator, wherein the low-precision CNN comprises a high-precision input feature map with a low-precision weight, wherein the weight precision is selected from 1-bit, 2-bit, or 4-bit.

There is further disclosed a CNN accelerator, wherein the CNN is a high-precision CNN.

There is further disclosed a CNN accelerator, wherein the high-precision CNN is selected from 8-bit integer and 16-bit floating point.

There is further disclosed a CNN accelerator, further comprising at least one accumulator, wherein the results of multiple inner-product convolutions are accumulated in a single accumulator.

There is further disclosed a CNN accelerator, further comprising reduction means to: receive a plurality of high-precision input operators; and reduce the plurality of high-precision input operators to a low-precision output operator.

There is further disclosed a CNN accelerator, further comprising a reduction module, comprising: a subtract circuit to compute the difference between a sum(*) and a first input operator ("OpC") to yield a first intermediate operator ("Op1"); a pass-through second ("OpE") and third ("OpD") input operators to yield second ("Op3") and third ("Op4") intermediate operators respectively; a multiply circuit to compute a product of a fourth ("OpA") and fifth ("OpB") input operator to yield a fourth intermediate input operator ("Op2"); and a reduction circuit to compute a reduction of Op1, Op3, Op4, and Op2.

There is further disclosed a CNN accelerator, wherein the input operators are half-precision floating point operators, and the output operator is a 1-bit or 2-bit integer operator.

There is further disclosed a CNN accelerator, wherein OpC, OpA, and OpB are configurable operands.

There is further disclosed a CNN accelerator, wherein the reduction circuit comprises a bit-select operator, wherein the output operator is selected from one or two digits of an accumulator.

There is further disclosed a CNN accelerator, wherein the output operator is selected from a sign digit of the accumulator.

There is further disclosed a CNN accelerator, wherein the reduction circuit comprises a quantization operator, wherein the output operator is selected based on a comparison of two or more of the intermediate operators.

There is further disclosed a CNN accelerator, wherein the two or more intermediate operators are Op1 and Op2, wherein the output operator is assigned a first value if Op1 is greater than Op2, and a second value otherwise.

There is further disclosed a CNN accelerator, wherein the two or more intermediate operators are Op1, Op2, and Op3, wherein the output operator is assigned a first value if Op1 is less than Op3, a second value is Op1 is between Op3 and Op2, and a third value otherwise.

There is further disclosed a CNN accelerator, wherein the subtract circuit is configurable to be a NONE circuit, wherein OpC is ignored.

There is further disclosed a CNN accelerator, wherein the multiply circuit is configurable to be a NONE circuit, wherein Op2=OpA, and OpB is ignored.

There are also disclosed one or more tangible, non-transitory computer-readable storage mediums having stored thereon instructions for providing a convolutional neural network (CNN) accelerator, comprising instructions to: provision a CNN circuit for performing a multiple-layer CNN computation, wherein the multiple layers are to receive an input feature according to an input feature map (IFM) and a weight matrix per output feature, wherein an output of a first layer provides an input for a next layer; and provision a mapping circuit to access a three-dimensional input matrix stored as a Z-major matrix; wherein the CNN circuit is to perform an inner-product direct convolution on the Z-major matrix, wherein the direct convolution lacks a lowering operation.

There are further disclosed one or more tangible, non-transitory computer-readable mediums, wherein the inner-product convolution is a vector-by-vector operation.

There are further disclosed one or more tangible, non-transitory computer-readable mediums, wherein the mapping circuit is to access the three-dimensional input as an X-major matrix and to rotate the matrix on three axes to generate the Z-major matrix.

There are further disclosed one or more tangible, non-transitory computer-readable mediums, wherein the CNN circuit is a low-precision CNN.

There are further disclosed one or more tangible, non-transitory computer-readable mediums, wherein the low-precision CNN is a 4-bit CNN.

There are further disclosed one or more tangible, non-transitory computer-readable mediums, wherein the low-precision CNN is a ternary CNN.

There are further disclosed one or more tangible, non-transitory computer-readable mediums, wherein the low-precision CNN is a binary CNN.

There are further disclosed one or more tangible, non-transitory computer-readable mediums, wherein the low-precision CNN comprises a high-precision input feature map with a low-precision weight, wherein the weight precision is selected from 1-bit, 2-bit, or 4-bit.

There are further disclosed one or more tangible, non-transitory computer-readable mediums, wherein the CNN is a high-precision CNN.

There are further disclosed one or more tangible, non-transitory computer-readable mediums, wherein the high-precision CNN is selected from 8-bit integer and 16-bit floating point.

There are further disclosed one or more tangible, non-transitory computer-readable mediums, further comprising at least one accumulator, wherein the results of multiple inner-product convolutions are accumulated in a single accumulator.

There are further disclosed one or more tangible, non-transitory computer-readable mediums, further comprising instructions to provision a reduction module, comprising: a subtract circuit to compute the difference between a sum(*) and a first input operator ("OpC") to yield a first intermediate operator ("Op1"); a pass-through second ("OpE") and third ("OpD") input operators to yield second ("Op3") and third ("Op4") intermediate operators respectively; a multiply circuit to compute a product of a fourth ("OpA") and fifth ("OpB") input operator to yield a fourth intermediate input operator ("Op2"); and a reduction circuit to compute a reduction of Op1, Op3, Op4, and Op2.

There are further disclosed one or more tangible, non-transitory computer-readable mediums, wherein the input operators are half-precision floating point operators, and the output operator is a 1-bit or 2-bit integer operator.

There are further disclosed one or more tangible, non-transitory computer-readable mediums, wherein OpC, OpA, and OpB are configurable operands.

There are further disclosed one or more tangible, non-transitory computer-readable mediums, wherein the reduction circuit comprises a bit-select operator, wherein the output operator is selected from one or two digits of an accumulator.

There are further disclosed one or more tangible, non-transitory computer-readable mediums, wherein the output operator is selected from a sign digit of the accumulator.

There are further disclosed one or more tangible, non-transitory computer-readable mediums, wherein the reduction circuit comprises a quantization operator, wherein the output operator is selected based on a comparison of two or more of the intermediate operators.

There are further disclosed one or more tangible, non-transitory computer-readable mediums, wherein the two or more intermediate operators are Op1 and Op2, wherein the output operator is assigned a first value if Op1 is greater than Op2, and a second value otherwise.

There are further disclosed one or more tangible, non-transitory computer-readable mediums, wherein the two or more intermediate operators are Op1, Op2, and Op3, wherein the output operator is assigned a first value if Op1 is less than Op3, a second value is Op1 is between Op3 and Op2, and a third value otherwise.

There are further disclosed one or more tangible, non-transitory computer-readable mediums, wherein the subtract circuit is configurable to be a NONE circuit, wherein OpC is ignored.

There are further disclosed one or more tangible, non-transitory computer-readable mediums, wherein the multiply circuit is configurable to be a NONE circuit, wherein Op2=OpA, and OpB is ignored.

There are further disclosed one or more tangible, non-transitory computer-readable mediums, wherein the one or more mediums comprise microcode instructions.

There are further disclosed one or more tangible, non-transitory computer-readable mediums, wherein the one or more mediums comprise hardware instructions.

There is also disclosed a computer-implemented method of providing a convolutional neural network (CNN) accelerator, comprising: provisioning a CNN circuit for performing a multiple-layer CNN computation, wherein the multiple layers are to receive an input feature according to an input feature map (IFM) and a weight matrix per output feature, wherein an output of a first layer provides an input for a next layer; and provisioning a mapping circuit to access a three-dimensional input matrix stored as a Z-major matrix; wherein the CNN circuit is to perform an inner-product direct convolution on the Z-major matrix, wherein the direct convolution lacks a lowering operation.

There is further disclosed a computer-implemented method, wherein the inner-product convolution is a vector-by-vector operation.

There is further disclosed a computer-implemented method, wherein the mapping circuit is to access the three-dimensional input as an X-major matrix and to rotate the matrix on three axes to generate the Z-major matrix.

There is further disclosed a computer-implemented method, wherein the CNN circuit is a low-precision CNN.

There is further disclosed a computer-implemented method, wherein the low-precision CNN is a 4-bit CNN.

There is further disclosed a computer-implemented method, wherein the low-precision CNN is a ternary CNN.

There is further disclosed a computer-implemented method, wherein the low-precision CNN is a binary CNN.

There is further disclosed a computer-implemented method, wherein the low-precision CNN comprises a high-precision input feature map with a low-precision weight, wherein the weight precision is selected from 1-bit, 2-bit, or 4-bit.

There is further disclosed a computer-implemented method, wherein the CNN is a high-precision CNN.

There is further disclosed a computer-implemented method, wherein the high-precision CNN is selected from 8-bit integer and 16-bit floating point.

There is further disclosed a computer-implemented method, further comprising at least one accumulator, wherein the results of multiple inner-product convolutions are accumulated in a single accumulator.

There is further disclosed a computer-implemented method, further comprising: receiving a plurality of high-precision input operators; and reducing the plurality of high-precision input operators to a low-precision output operator.

There is further disclosed a computer-implemented method, further comprising provisioning a reduction module, comprising: a subtract circuit to compute the difference between a sum(*) and a first input operator ("OpC") to yield a first intermediate operator ("Op1"); a pass-through second ("OpE") and third ("OpD") input operators to yield second ("Op3") and third ("Op4") intermediate operators respectively; a multiply circuit to compute a product of a fourth ("OpA") and fifth ("OpB") input operator to yield a fourth intermediate input operator ("Op2"); and a reduction circuit to compute a reduction of Op1, Op3, Op4, and Op2.

There is further disclosed a computer-implemented method, wherein the input operators are half-precision floating point operators, and the output operator is a 1-bit or 2-bit integer operator.

There is further disclosed a computer-implemented method, wherein OpC, OpA, and OpB are configurable operands.

There is further disclosed a computer-implemented method, wherein the reduction circuit comprises a bit-select operator, wherein the output operator is selected from one or two digits of an accumulator.

There is further disclosed a computer-implemented method, wherein the output operator is selected from a sign digit of the accumulator.

There is further disclosed a computer-implemented method, wherein the reduction circuit comprises a quantization operator, wherein the output operator is selected based on a comparison of two or more of the intermediate operators.

There is further disclosed a computer-implemented method, wherein the two or more intermediate operators are Op1 and Op2, wherein the output operator is assigned a first value if Op1 is greater than Op2, and a second value otherwise.

There is further disclosed a computer-implemented method, wherein the two or more intermediate operators are Op1, Op2, and Op3, wherein the output operator is assigned a first value if Op1 is less than Op3, a second value is Op1 is between Op3 and Op2, and a third value otherwise.

There is further disclosed a computer-implemented method, wherein the subtract circuit is configurable to be a NONE circuit, wherein OpC is ignored.

There is further disclosed a computer-implemented method, wherein the multiply circuit is configurable to be a NONE circuit, wherein Op2=OpA, and OpB is ignored.

There is further disclosed an apparatus comprising means for performing the method of a number of the above examples.

There is further disclosed an apparatus, wherein the means for performing the method comprise a system on a chip.

There is further disclosed an apparatus, wherein the system on a chip comprises an application-specific instruction set processor (ASIP) and a CNN accelerator.

There is further disclosed an apparatus, wherein the means comprise one or more tangible, non-transitory computer-readable mediums comprising instructions to perform the method of a number of the above examples.

There is further disclosed an apparatus, wherein the one or more mediums comprise microcode instructions.

There is further disclosed an apparatus, wherein the one or more mediums comprise hardware instructions.

There is further disclosed a convolutional neural network (CNN) accelerator, comprising: an execution circuit comprising a convolution row, the convolution row comprising convolution elements of a first precision and a second precision, wherein a set of possible outputs of the first precision vary from a set of possible outputs of the second precision by a multiplicative factor; and an adder tree circuit shared between the convolution element of the first precision and the convolution element of the second precision, wherein the adder tree is to selectively accept inputs from one of the convolution elements and to selectively apply the multiplicative factor to its output.

There is further disclosed an example, wherein the first precision is 1-bit.

There is further disclosed an example, wherein the second precision is 2-bit.

There is further disclosed an example, wherein the 2-bit precision provides a ternary CNN.

There is further disclosed an example, wherein the first precision is 1-bit, the second precision is 2-bit to provide a ternary CNN, and the multiplicative factor is two.

There is further disclosed an example, wherein the adder tree comprise an array of multiplexers to select between the convolution elements of the first precision and second precision.

There is further disclosed an example, further comprising an output multiplexer to select between an output of the first precision and second precision.

There is further disclosed an example, wherein applying the multiplicative factor comprising left shifting the output.

There is further disclosed an example, wherein the multiplicative factor is two, and wherein left shifting the output comprises left shifting the output by one bit.

There is further disclosed an example of a system on a chip comprising the CNN accelerator of any of the preceding examples.

There is further disclosed an example, further comprising an application-specific instruction set processor (ASIP) to control operation of the CNN accelerator.

There is further disclosed an example of a computing system comprising the system on a chip of any of the preceding examples.

There is further disclosed an example of one or more tangible, non-transitory computer-readable mediums having stored thereon executable instructions to provide a convolutional neural network (CNN) accelerator, comprising instructions to: provision an execution circuit comprising a convolution row, the convolution row comprising convolution elements of a first precision and a second precision, wherein a set of possible outputs of the first precision vary from a set of possible outputs of the second precision by a multiplicative factor; and provision an adder tree circuit shared between the convolution element of the first precision and the convolution element of the second precision, wherein the adder tree is to selectively accept inputs from one of the convolution elements and to selectively apply the multiplicative factor to its output.

There is further disclosed an example, wherein the first precision is 1-bit.

There is further disclosed an example, wherein the second precision is 2-bit.

There is further disclosed an example, wherein the 2-bit precision provides a ternary CNN.

There is further disclosed an example, wherein the first precision is 1-bit, the second precision is 2-bit to provide a ternary CNN, and the multiplicative factor is two.

There is further disclosed an example, wherein the adder tree comprise an array of multiplexers to select between the convolution elements of the first precision and second precision.

There is further disclosed an example, wherein the instructions are further to provision an output multiplexer to select between an output of the first precision and second precision.

There is further disclosed an example, wherein applying the multiplicative factor comprising left shifting the output.

There is further disclosed an example, wherein the multiplicative factor is two, and wherein left shifting the output comprises left shifting the output by one bit.

There is further disclosed an example, wherein the one or more mediums comprise microcode instructions.

There is further disclosed an example, wherein the one or more mediums comprise hardware instructions.

There is further disclosed an example, wherein the one or more mediums comprise instructions for building a hardware circuit device.

There is further disclosed an example of a computer-implemented method of providing a convolutional neural network (CNN) accelerator, comprising: provisioning an execution circuit comprising a convolution row, the convolution row comprising convolution elements of a first precision and a second precision, wherein a set of possible outputs of the first precision vary from a set of possible outputs of the second precision by a multiplicative factor; and provisioning an adder tree circuit shared between the convolution element of the first precision and the convolution element of the second precision, wherein the adder tree is to selectively accept inputs from one of the convolution elements and to selectively apply the multiplicative factor to its output.

There is further disclosed an example, wherein the first precision is 1-bit.

There is further disclosed an example, wherein the second precision is 2-bit.

There is further disclosed an example, wherein the 2-bit precision provides a ternary CNN.

There is further disclosed an example, wherein the first precision is 1-bit, the second precision is 2-bit to provide a ternary CNN, and the multiplicative factor is two.

There is further disclosed an example, wherein the adder tree comprise an array of multiplexers to select between the convolution elements of the first precision and second precision.

There is further disclosed an example, wherein the instructions are further to provision an output multiplexer to select between an output of the first precision and second precision.

There is further disclosed an example, wherein applying the multiplicative factor comprising left shifting the output.

There is further disclosed an example, wherein the multiplicative factor is two, and wherein left shifting the output comprises left shifting the output by one bit.

There is further disclosed an example of an apparatus comprising means for performing the method.

There is further disclosed an example, wherein the means for performing the method comprise a system on a chip.

There is further disclosed an example, wherein the system on a chip comprises an application-specific instruction set processor (ASIP) and a CNN accelerator.

There is further disclosed an example, wherein the means comprise one or more tangible, non-transitory computer-readable mediums comprising instructions to perform the method of the preceding examples.

There is further disclosed an example, wherein the one or more mediums comprise microcode instructions.

There is further disclosed an example, wherein the one or more mediums comprise hardware instructions.

What is claimed is:

1. A convolutional neural network (CNN) accelerator, comprising:
    a CNN circuit for performing computation in a CNN layer of a CNN, wherein the CNN layer is to receive a three-dimensional input matrix and to generate an output; and
    a mapping circuit configured to:
    access the three-dimensional input matrix from a first memory, wherein the three-dimensional input matrix comprises data elements in a X-Y-Z data structure, the data elements of the three-dimensional input matrix are stored in a first storage order, and a layout of the first memory comprises a first memory location, in which data elements having different X coordinates and a same Y or Z coordinate are stored continuously, and a second memory location, in which data elements having different X coordinates and another same Y or Z coordinate are stored continuously,
    convert the first storage order of the data elements to a second storage order that is different from the first storage order, and
    write the three-dimensional input matrix into a second memory in accordance with the second storage order, wherein a layout of the second memory comprises a first memory location, in which data elements having different Z coordinates and a same X or Y coordinate are stored continuously, and a second memory location, in which data elements having different Z coordinates but another same X or Y coordinate are stored continuously,
wherein the CNN circuit is configured to perform the computation in the CNN layer on the three-dimensional input matrix retrieved from the second memory.

2. The CNN accelerator of claim 1, wherein the computation in the CNN layer comprises an inner-product convolution that is a vector-by-vector operation.

3. The CNN accelerator of claim 1, wherein converting the first storage order of the data elements of the three-dimensional input matrix to the second storage order comprises rotating two-dimensional matrices in the three-dimensional input matrix on X, Y, or Z axis.

4. The CNN accelerator of claim 1, wherein the CNN is a low-precision CNN.

5. The CNN accelerator of claim 4, wherein the low-precision CNN is a 4-bit CNN.

6. The CNN accelerator of claim 4, wherein the low-precision CNN is a ternary CNN.

7. The CNN accelerator of claim 4, wherein the low-precision CNN is a binary CNN.

8. The CNN accelerator of claim 4, wherein the low-precision CNN comprises a high-precision input feature map with a low-precision weight, and the weight precision is 1-bit, 2-bit, or 4-bit.

9. The CNN accelerator of claim 1, wherein the CNN is a high-precision CNN.

10. The CNN accelerator of claim 9, wherein the high-precision CNN is selected from 8-bit integer and 16-bit floating point.

11. The CNN accelerator of claim 1, further comprising at least one accumulator, wherein the results of multiple inner-product convolutions are accumulated in a single accumulator.

12. The CNN accelerator of claim 1, further comprising a reduction module, the reduction module to:
receive a plurality of high-precision input operators; and
change the plurality of high-precision input operators to a low-precision output operator.

13. The CNN accelerator of claim 1, further comprising a reduction module, the reduction module comprising:
a subtract circuit to compute the difference between a value and a first input operand to yield a first intermediate operand;
a pass-through of a second input operand and a third input operand to yield a second intermediate operand and a third intermediate operand, respectively;
a multiply circuit to compute a product of a fourth input operand and a fifth input operand to yield a fourth intermediate input operand; and
a reduction circuit to compute an output operator by computing a reduction of the first intermediate operand, the second intermediate operand, the third intermediate operand, and the fourth intermediate operand.

14. The CNN accelerator of claim 13, wherein the first input operand, the second input operand, the third input operand, the fourth input operand, and the fifth input operand are half-precision floating point operands, and the output operator is a 1-bit or 2-bit integer operand.

15. The CNN accelerator of claim 13, wherein the first input operation, the fourth input operand, and the fifth input operation are configurable operands.

16. The CNN accelerator of claim 13, wherein the reduction circuit comprises a bit-select operator, and the output operator is selected from one or two digits of an accumulator.

17. The CNN accelerator of claim 16, wherein the output operator is selected from a sign digit of the accumulator.

18. The CNN accelerator of claim 13, wherein the reduction circuit comprises a quantization operator, and the output operator is selected based on a comparison of two or more of the intermediate operators.

19. One or more tangible, non-transitory computer-readable storage mediums storing instructions executable to:
receive a three-dimensional input matrix of a CNN layer of a CNN;
access the three-dimensional input matrix from a first memory, wherein the three-dimensional input matrix comprises data elements in a X-Y-Z data structure, the data elements of the three-dimensional input matrix are stored in a first storage order, and a layout of the first memory comprises a first memory location, in which data elements having different X coordinates and a same Y or Z coordinate are stored continuously, and a second memory location, in which data elements having different X coordinates and another same Y or Z coordinate are stored continuously
convert the first storage order of the data elements to a second storage order that is different from the first storage order;
write the three-dimensional input matrix into a second memory in accordance with the second storage order, wherein a layout of comprises a first memory location, in which data elements having different Z coordinates and a same X or Y coordinate are stored continuously, and a second memory location, in which data elements having different Z coordinates but another same X or Y coordinate are stored continuously; and
perform an inner-product direct convolution in the CNN layer on the three-dimensional input matrix retrieved from the second memory.

20. The one or more tangible, non-transitory computer-readable mediums of claim 19, wherein the inner-product convolution is a vector-by-vector operation.

21. The one or more tangible, non-transitory computer-readable mediums of claim 19, wherein converting the first storage order of the data elements of the three-dimensional input matrix to the second storage order comprises rotating two-dimensional matrices in the three-dimensional input matrix on X, Y, or Z axis.

22. The one or more tangible, non-transitory computer-readable mediums of claim 19, wherein the CNN is a low-precision CNN.

23. The one or more tangible, non-transitory computer-readable mediums of claim 22, wherein the low-precision CNN is a ternary CNN or binary CNN.

24. A computer-implemented method comprising:
receiving a three-dimensional input matrix of a CNN layer of a CNN
accessing the three-dimensional input matrix from a first memory, wherein the three-dimensional input matrix comprises data elements in a X-Y-Z data structure, the data elements of the three-dimensional input matrix are stored in a first storage order, and a layout of the first memory comprises a first memory location, in which data elements having different X coordinates and a same Y or Z coordinate are stored continuously, and a second memory location, in which data elements having different X coordinates but another same Y or Z coordinate are stored continuously;
converting the first storage order of the data elements to a second storage order that is different from the first storage order;

writing the three-dimensional input matrix into a second memory in accordance with the second storage order, wherein a layout of the second memory comprises a first memory location, in which data elements having different Z coordinates and a same X or Y coordinate are stored continuously, and a second memory location, in which data elements having different Z coordinates but another same X or Y coordinate are stored continuously; and performing an inner-product direct convolution in the CNN layer on the three-dimensional input matrix retrieved from the second memory.

25. The computer-implemented method of claim 24, wherein converting the first storage order of the data elements of the three-dimensional input matrix to the second storage order comprises rotating first two-dimensional matrices in the three-dimensional input matrix on X, Y, or Z axis.

* * * * *